(12) United States Patent
Owada et al.

(10) Patent No.: US 6,185,665 B1
(45) Date of Patent: Feb. 6, 2001

(54) FILE MANAGEMENT APPARATUS, FILE MANAGEMENT METHOD, AND RECORDING MEDIUM CONTAINING FILE MANAGEMENT PROGRAM

(75) Inventors: Kiyoshi Owada, Hirakatashi; Masaya Miyazaki, Ikedashi, both of (JP)

(73) Assignee: Matsushita Electric Industrial Co., Ltd. (JP)

(*) Notice: Under 35 U.S.C. 154(b), the term of this patent shall be extended for 0 days.

(21) Appl. No.: 09/030,373

(22) Filed: Feb. 25, 1998

(30) Foreign Application Priority Data

Feb. 28, 1997 (JP) .................................................... 9-046401

(51) Int. Cl.[7] .................................................... G06F 12/00
(52) U.S. Cl. .......................... 711/170; 711/112; 711/171; 711/172; 707/205
(58) Field of Search ..................................... 711/112, 103, 711/170, 171, 209, 172; 707/206, 205, 7

(56) References Cited

U.S. PATENT DOCUMENTS

| | | | |
|---|---|---|---|
| 4,347,565 | * | 8/1982 | Kaneda et al. ............................ 711/6 |
| 4,797,810 | * | 1/1989 | McEntee et al. ..................... 707/206 |
| 5,109,336 | * | 4/1992 | Guenther et al. .................... 711/171 |
| 5,414,839 | * | 5/1995 | Joshi ......................................... 707/8 |
| 5,561,785 | * | 10/1996 | Blandy et al. ....................... 711/170 |
| 5,754,766 | * | 5/1998 | Shaw et al. .......................... 709/200 |

FOREIGN PATENT DOCUMENTS 4-225441   8/1992 (JP) .

* cited by examiner

*Primary Examiner*—John W. Cabeca
*Assistant Examiner*—Matthew D. Anderson
(74) *Attorney, Agent, or Firm*—Parkhurst & Wendel, L.L.P

(57) ABSTRACT

A file management apparatus is used in an information processor using a media exchange type storage device including a plurality of storage media, at least one data access device, and a storage media exchanging means as an external storage device. The file management apparatus includes a data block management device for dividing storage regions of the respective storage media into data blocks of fixed capacity and managing the use states of the divided data blocks. A data block allocation device allocates unused data blocks shown by the data block management device to a file to which a writing request from the information processor has been given.

32 Claims, 24 Drawing Sheets

Fig.2 data block management table 111

| data block number | use flag |
|---|---|
| 0 | used |
| 1 | used |
| 2 | unused |
| 3 | unused |
| 4 | used |
| 5 | used |
| 6 | used |
| 7 | used |
| 8 | unused |
| 9 | unused |
| 10 | unused |
| ⋮ | ⋮ |

Fig.3 file management table 121

| file name | used data block number sequence |
|---|---|
| file 1 | 0, 1 |
| file 2 | 11, 7, 12, 24 |
| file 3 | 4 |
| file 4 | 5, 6, 13 |
| ⋮ | ⋮ |

Fig.4 data block corresponding table 211

| data block number | optical disk number | calculating expression of real data block number |
|---|---|---|
| 0~999 | M0 | data block number - 0 |
| 1000~1999 | M1 | data block number - 1000 |
| 2000~2999 | M2 | data block number - 2000 |
| 3000~3999 | M3 | data block number - 3000 |
| 4000~4999 | M4 | data block number - 4000 |
| 5000~5999 | M5 | data block number - 5000 |
| ⋮ | ⋮ | ⋮ |

Fig.5 (a)

optical disk management table (by disk) 221a

| optical disk number | current position |
|---|---|
| M0 | storage slot 0 |
| M1 | storage slot 1 |
| M2 | storage slot 2 |
| M3 | drive D0 |
| M4 | storage slot 4 |
| M5 | storage slot 5 |
| M6 | storage slot 6 |
| M7 | drive D1 |
| M8 | storage slot 8 |
| M9 | storage slot 9 |

Fig.5 (b)

optical disk management table (by drive) 221b

| drive number | optical disk number | command accept time |
|---|---|---|
| D0 | M3 | 96/12/01 19:05 |
| D1 | M7 | 96/12/03 09:24 |
| D2 | no disk | |
| D3 | no disk | | disk access management table 131 drive access management table 132

Fig.18 disk access management table 131

| optical disk number | access state | allocation state |
|---|---|---|
| M0 | no access | allocated |
| M1 | no access | unallocated |
| M2 | no access | unallocated |
| M3 | accessed | unallocated |
| M4 | no access | unallocated |
| M5 | no access | unallocated |
| M6 | no access | unallocated |
| M7 | accessed | allocated |
| M8 | no access | unallocated |
| M9 | no access | unallocated |

Fig.25 disk access management table 131

| optical disk number | access state |
|---|---|
| M0 | no access |
| M1 | no access |
| M2 | no access |
| M3 | reading |
| M4 | no access |
| M5 | no access |
| M6 | no access |
| M7 | reading |
| M8 | no access |
| M9 | no access |

FILE MANAGEMENT APPARATUS, FILE MANAGEMENT METHOD, AND RECORDING MEDIUM CONTAINING FILE MANAGEMENT PROGRAM

FIELD OF THE INVENTION

The present invention relates to a file management apparatus, a file management method, and a recording medium containing a file management program, in an information processor using a media exchange type storage device which is represented by an optical disk library, as an external storage device and, more particularly, to those by which a file that is readable in real time and with less exchange of optical disks can be created.

BACKGROUND OF THE INVENTION

As prior art methods of using a media exchange type storage device represented by an optical disk library as an external storage device, there have been known two methods; a method which is basically equivalent to a method of utilizing external optical disk drives and has a means for automatically mounting an optical disk (storage medium) to be accessed, in an optical disk drive (data access device) as the only feature, and a method disclosed by Japanese Published Patent Application No. Hei. 7-93110, in which a plurality of optical disks are virtually treated as a single storage device.

In both of the methods, a prior art data writing process to an external storage device is used for data writing to an optical disk serving as a storage medium.

The prior art data writing process to an external storage device is disclosed in detail by Japanese Published Patent Application No. Hei. 4-225441.

As methods for locating file data on a storage medium, there are a data block allocation method and a continuous region allocation method.

The data block allocation method comprises dividing a storage medium into data blocks of fixed capacity, generally, a few hundreds of bytes to a few kilobytes, and writing data to the storage medium while successively allocating unused data blocks to the data. In this data block allocation method, when data of one file are written to plural data blocks, the positional relationships between the used data blocks are not considered. In this method, storage positions of a file are generally managed as a list of data block numbers (data block addresses) assigned to respective data blocks.

Meanwhile, in the continuous region allocation method, storage positions of a file are managed according to a top address and a length of data.

In the data block allocation method, since storage regions for respective blocks are allocated even when file writing and partial erasure are repeated, the storage regions can be effectively utilized. However, data of a file must be extracted from data blocks which are disorderedly located in several parts of a storage medium, so that it takes time to read the file.

In the continuous region allocation method, since data of a file are located continuously, file reading can be carried out at high speed. However, when file writing and partial erasure are repeated, continuous unused storage regions enough for file storage are not found although many unused storage regions remain, so that many useless storage regions are produced.

Conventiornally, it has been taken for granted that the continuous region allocation method is used for an optical disk, in order to read multimedia data, such as voice data and moving picture data, at high speed and perform processing in real time. In recent years, however, even when the data block allocation method is used for an optical disk, an improvement of reading performance has made processing in real time possible.

Further, effective use of storage regions of an optical disk of mass storage has been regarded as important, and the data block allocation method has been generally used for an optical disk.

A description is given of a data block allocation method in a prior art information processor in which a plurality of optical disks in an optical disk library are virtually treated as a single storage device, with reference to FIGS. 1, 2, 3, 4 and 5(a) and 5(b) which show component parts common with a file management apparatus according to a first embodiment of the present invention, and FIG. 24 which shows the operation of the prior art information processor.

FIG. 1 is a block diagram illustrating a general construction of an information processor in which a plurality of optical disks in an optical disk library are virtually treated as a single storage device.

In FIG. 1, an information processor 1 has an optical disk library 300 as an external storage device, and includes a file management apparatus 2. The file management apparatus 2 comprises a file managment unit 100 and a disk management unit 200.

The file management unit 100 comprises a data block management unit 110 for managing data blocks and a data block allocation unit 120 for allocating data blocks to files. The data block management unit 110 has a data block management table 111 illustrated in FIG. 2, and the data block allocation unit 120 has a file management table 121 illustrated in FIG. 3.

The disk management unit 200 comprises a virtual disk management unit 210 and an optical disk library control unit 220. The virtual disk management unit 210 has a data block corresponding table 211 illustrated in FIG. 4, and the optical disk library control unit 220 has an optical disk management table 221 illustrated in FIGS. 5(a) and 5(b).

The optical disk library 300 includes optical disk drives D0 to D3 serving as data access devices, optical disks M0 to M9 serving as storage media, and an optical disk exchanging device 310 for mounting the optical disks in the optical disk drives D0 to D3 according to requests from the outside.

FIG. 24 is a flow chart showing the operation of the information processor for virtually treating the plurality of optical disks in the optical disk library as a single storage device.

A description is given of the operation of the information processor thus constructed, with reference to FIG. 24.

When the file management unit 100 in the file management apparatus 2 receives a writing request of a file, at step S1201, the data block management unit 110 examines whether unused data blocks are present or not, using the data block management table 111.

When no unused data blocks are present, no file can be stored. Therefore, the writing process is completed as a file writing error due to shortage of the capacity (step S1207).

When the unused data blocks are present, step S1202 is executed, The data block management unit 110 selects one unused data block from the data block management table 111, and updates the data block management table 111, i.e., changes the use flag of the selected data block to "used". For example, the data block with the number "2" is selected from the data block management table 111 shown in FIG. 2, and the use flag of the data block with the number "2" is changed to "used".

Then, at step S1203, the data block allocation unit 120 allocates the selected data block as a data storage block for the file to be written, and updates the file management table 121. For example, when the file 3 is additionally written in the file management table 121 shown in FIG. 3, the data block number "2" of the data block selected at step S1202 is added to the used data block number list of the file 3, and the used data block number list of the file 3 is changed to "4, 2". When a new file which has been not recorded in the file management table 121, for example, a file 10, is written, a new field for the file 10 is created in the file management table 121, and the used data block number list of the field is made "2".

Subsequently, at step S1204, the file management unit 100 instructs the disk management unit 200 to write the file data to the allocated data block. When the disk management unit 200 receives this instruction, using the data block corresponding table 211, the disk management unit 200 obtains an optical disk number of an optical disk having the data block to which the file data is to be written, and calculates a real data block number of the data block on the optical disk, by the virtual disk management unit 210.

In this case, since the data block with the number "2" is on the optical disk M0, the real data block number of the data block on the optical disk M0 is "2" (2−0=2).

Then, using the optical disk management table 221, the disk management unit 200 selects an optical disk drive used in file data writing by the optical disk library control unit 220, and instructs the optical disk library 100 to mount the optical disk for file writing in the selected optical disk drive. When the optical disk library 300 receives this instruction, the optical disk library 300 mounts the optical disk in the optical disk drive according to the instruction, by the optical disk exchanging device 310.

Usually, as this selection method, it is first examined whether the optical disk for file writing is mounted in any of the optical disk drives or not. When the optical disk for file writing has been mounted in the optical disk drive, that optical disk drive is selected and the optical disk is left as it is. When the optical disk for file writing is mounted in none of the optical disk drives, the disk management unit 200 finds out and selects the optical disk drive in which no other optical disk is mounted, and instructs the optical disk library 300 to mount the optical disk for file writing in the selected optical disk drive. If the disk management unit 200 does not find out the optical disk drive in which no other optical disk is mounted, the disk management unit 200 selects the optical disk drive having the oldest command accept time, and instructs the optical disk library 300 to return the optical disk mounted in the selected optical disk drive to its storage slot and then to mount the optical disk for file writing in the slected optical disk drive.

By using such a selection method, time required for exchanging optical disks is shortened and processing time is evenly allocated to each file access.

Thereafter, using the selected optical disk drive in the optical disk library 300, the disk management unit 200 writes the file data to the data block with the real data block number "2" on the optical disk M0 which is mounted in the optical disk drive, by the optical disk library control unit 220.

Then, at step S1205, the file management unit 100 examines whether the file data to be further written remains or not.

When the data to be written remains, the writing process returns to step S1201, and block allocation/file writing processes are repeated until all the data is written.

When no data to be written remains, the file writing process is completed (step S1206).

As in the information processor described above, however, when a media exchange type storage device, such as an optical disk library, is utilized, access performance of an optical disk serving as a storage medium is deteriorated as compared with that of a usual hard disk, arid processing required for exchanging optical disks adversely affects the performance of the data access.

Further, in the prior are data block allocation method, selection of data blocks to be allocated to a file is not taken into consideration. Therefore, there is a case where optical disks must be exchanged many times at access to the file, in a manner that a top data of the file is stored in the first optical disk and a next data of the file is stored in the second optical disk, so that it is difficult to use the data block allocation method for file reading in real time.

Still further, when plural file writing processes are simultaneously performed to one optical disk, the files scramble for data blocks on the optical disk, whereby all the data blocks on the optical disk are used up immediately and the remaining data of the files are written to a next optical disk, resulting in an increase in exchange of optical disks Consequently, in order to write files which is readable in real time, the plural simultaneous writing processes cannot be allowed.

Still further, when a file is written to an optical disk from which another file is being read, the limit of the access performance of the optical disk deteriorates reading performance, so that reading in real time cannot be realized. Consequently, it is impossible that file reading and file writing coexist.

Still further, when a file is written to an optical disk which is not mounted in an optical disk drive, the optical disk for writing is mounted to an optical disk drive. At this time, there is a case where an optical disk that is being currently accessed is dismounted from an optical disk drive and the optical disk for writing is mounted therein. In this case, the access to the optical disk which has been dismounted from the optical disk drive is suspended, so that the access takes time above required.

Furthermore, the operation of remounting the optical disk in the optical disk drive after the suspended access coexists with the operation of mounting the optical disk for writing in the optical disk drive, whereby exchange of the optical disks is repeated many times, resulting in incompletion of the previous access and the writing.

SUMMARY OF THE INVENTION

It is an object of the present invention to provide a file management apparatus, a file management method, and a recording medium containing a file management program, by which a file that is readable in real time and with less exchange of optical disks can be created.

Another object of the present invention is to provide a file management apparatus in which, when a file that is readable in real time is created, plural file writing processes to one optical disk can coexist.

Further another object of the present invention is to provide a file management apparatus in which, when a file that is readable in real time is created, file reading and file writing from/to one optical disk can coexist.

Further another object of the present invention is to provide a file management apparatus in which, when a file that is readable in real time is created, suspension of access which is being currently performed and exchange of optical disks due to the suspended access are prevented, whereby time required for the writing can be shortened.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a file management apparatus is used in an information processor using a media exchange type storage device comprising a plurality of storage media, at least one data access device for recording and reproducing data to/from the storage media, and a storage media exchanging means for mounting and dismounting the arbitrary storage medium in/from the arbitrary data access device, as an external storage device, and the file management apparatus includes a data block management means for dividing storage regions of the respective storage media into data blocks of fixed capacity and managing the use states of the divided data blocks; and d data block allocation means for allocating unused data blocks shown by the data block management means to a file to which a writing request from the information processor has been given, wherein data writing of the file to which the writing request has been given is performed to the data blocks allocated by the data block allocation means, using the storage media exchanging means and the data access device; and at the start of file writing, the storage medium having the most unused data blocks which are shown by the data block management means is selected as a medium for writing. Therefore, it is possible to create a file which is read with less exchange of storage media during the reading process. Further, even when the file size is unknown at the start of file writing, it is immediately proved that the file cannot be written to any other storage medium when a writing error occurs due to shortage of the capacity of the selected storage medium. Accordingly, the writing process of the file does not need to be retried.

According to a second aspect of the present invention, in the file management apparatus of the first aspect, the data block allocation means limits the data blocks allocated to the file to which the writing request has been given to a range of the data blocks on the selected storage medium. Therefore, it is possible to create a file which is read without exchanging a storage medium during the reading process. Consequently, the file is readable at a constant access speed without suspending the reading process.

According to a third aspect of the present invention, the file management apparatus of the first or second aspect includes a file writing detection means for detecting the start and completion of the file writing; and a media writing management means for managing the presence of writing to the respective storage media based on information from the file writing detection means and information from the data block management means, wherein when the data blocks on the storage medium to which a file is being written, shown by the media writing management means, are allocated for writing a new file by the data block allocation means, the new file writing is temporarily suspended until the previous writing to the allocated storage medium is completed. Therefore, when plural file writing processes to one storage medium coexist, data block allocation to a file is not performed until writing of another file which has been first started is completed, whereby the files do not scramble for the data blocks. Consequently, even when there is not enough capacity for writing all the files, it is possible to decrease the number of data blocks which result in being wasted because parts of the files are written to the storage medium and the storage medium becomes short of the capacity, as compared with the case where the data blocks are allocated in parallel to the plural files.

Also in a case of a file extending over a plurality of storage media, when plural file writing processes to one storage medium coexist, the files do not scramble for data blocks. Consequently, even when there is not enough capacity for writing all the files, it is possible to decrease the number of files which result in extending over a plurality of storage media because parts of the files are written to the first storage medium and the storage medium becomes short of the capacity, as compared with the case where the data blocks are allocated to the plural files in parallel.

In addition, paying attention to one file, a file which has first started a writing process is given priority in that data block allocation. Therefore, more data blocks are allocated to one file as compared with the case where the data blocks are allocated to plural files in parallel, whereby it is possible to create a file which is read with less exchange of storage media during the reading process.

According to a fourth aspect of the present invention, the file management apparatus of the first or second aspect includes a file writing detection means for detecting the start and completion of the file writing; and a media writing management means for managing the presence of writing to the respective storage media based on information from the file writing detection means and information from the data block management means, wherein when the data blocks on the storage medium to which a file is being written, shown by the media writing management means, are allocated for writing a new file by the data block allocation means, the new file writing is aborted and the allocation of the data blocks is nullified. Therefore, when plural file writing processes to one storage medium coexist, writing of a new file is aborted until writing of a file which has been first started is completed, whereby the files do not scramble for the data blocks. Consequently, even when there is not enough capacity for writing all the files, it is possible to decrease the number of data blocks which result in being wasted because parts of the files are written to the storage medium and the storage medium becomes short of the capacity, as compared with the case where the data blocks are allocated to the plural files in parallel.

Further, when the new file writing is resumed after the abortion, the number of unused data blocks on each storage medium changes due to the previous file writing. Accordingly, a storage medium having the most unused data blocks after the change is selected.

According to a fifth aspect of the present invention, in the file management apparatus of the first or second aspect, data reading of a file to which a reading request from the information processor has been given is performed from the data blocks on the storage medium to which the data have been written, using the storage media exchanging means and the data access device, and the file management apparatus includes a file reading detection means for detecting the start and completion of the file reading; and a media reading management means for managing the presence of reading from the respective storage media based on information from the file reading detection means and information from the data block management means, wherein when the data blocks on the storage medium from which a file is being read, shown by the media reading management means, are allocated for writing a new file by the data block allocation means, the new file writing is aborted or temporarily suspended until the reading from the allocated storage medium is completed. Therefore, the previous reading process is not impeded. Consequently, when file reading and file writing coexist, an access speed for the reading can be kept constant without being disturbed by the writing.

According to a sixth aspect of the present invention, in the file management apparatus of the first or second aspect, data reading of a file to which a reading request from the information processor has been given is performed from the data blocks on the storage medium to which the data have been written, using the storage media exchanging means and the data access device, and the file management apparatus includes a file access detection means for detecting the start and completion of the file writing and reading; and a data access device management means for managing the use states of the respective data access devices based on information from the file access detection means, wherein the data access device which is being used, shown by the data access device management means, is not used for writing a new file; and when the data access device management means shows that all the data access devices are being used, the new file writing is aborted or temporarily suspended until one of the data access devices becomes unused. Therefore, the previous accesses are not impeded. Consequently, when file reading and file writing coexist, a storage medium from which a file is being read is not dismounted from a data access device used for the reading and a storage medium to which d file is to be written is not mounted therein. As a result, an access speed for the reading can be kept constant without being interrupted.

In addition, when plural file writing processes coexist, exchange of storage media for writing files is not performed until writing processes of other files which have been first started are completed, whereby the files do not scramble for the data access devices. Accordingly, it is possible to decrease the exchange of storage media which is performed until all the files are written and to shorten time required for the writing processes.

According to a seventh aspect of the present invention, the file management apparatus of the first or second aspect includes a file writing detection means for detecting the start and completion of the file writing; and a media writing management means for managing the presence of writing to the respective storage media based on information from the file writing detection means and information from the data block management means, wherein at the start of file writing, from among the storage media to which no files are being written, shown by the media writing management means, the storage medium having the most unused data blocks which are shown by the data block management means is selected as a medium for writing. Therefore, when plural file writing processes coexist, a file is written to a storage medium different from a storage medium to which writing of another file that has been first started is being performed. Consequently, the files do not scramble for data blocks on one storage medium, and the files are written in parallel when the media exchange type storage device has a plurality of data access devices, whereby time required for the file writing processes can be shortened.

According to an eighth aspect of the present invention, in the file management apparatus of the first or second aspect, data reading of a file to which a reading request from the information processor has been given is performed from the data blocks on the storage medium to which the data have been written, using the storage media exchanging means and the data access device, and the file management apparatus includes a file reading detection means for detecting the start and completion of the file reading; and a media reading management means for managing the presence of reading from the respective storage media based on information from the file reading detection means and information from the data block management means, wherein at the start of file writing, from among the storage media from which no files are being read, shown by the media reading management means, the storage medium having the most unused data blocks which are shown by the data block management means is selected as a medium for writing. Therefore, the previous reading process is not impeded. Consequently, when file reading and file writing coexist, an access speed for the reading can be kept constant without being disturbed by the writing.

According to a ninth aspect of the present invention, in the file management apparatus of the third, fifth, or sixth aspect, the data block allocation means receives a file size together with the file writing request from the information processor, and allocates data blocks corresponding to the received file size to the file, before the data writing. Therefore, even when access to a storage medium to which another file data is being written is not accepted, data block allocation to a file data is preformed in parallel with the previous writing process, and the data block allocation is already completed when the file data is written, whereby the total time required for the file writing can be shortened.

According to a tenth aspect of the present invention, in the file management apparatus of the ninth aspect, when the temporarily suspended writing is resumed, among the files to which the data blocks are allocated by the data block allocation means, the file that is to be written to the storage medium having the allocated data blocks which has been mounted in the data access device is given priority. Therefore, even when access to a storage medium to which another file data is being written is not accepted, if there is a request that is waiting for writing to a storage medium which has been already mounted in a data access device, the writing request is first processed. Consequently, the exchange of storage media is decreased, whereby time required for the writing can be shortened.

According to an eleventh aspect of the present invention, the file management apparatus of the second aspect includes a virtual disk management means for managing sets of media numbers for identifying the storage media and data block numbers for identifying the data blocks on the respective storage media, and the corresponding virtual data block numbers for identifying the data blocks on all the storage media, converting, for a writing request to the data block specified by the virtual data block number, the virtual data block number of the requested data block into the corresponding media number and data block number, and performing writing to the data block with the obtained data block number on the storage medium with the obtained media number, using the storage media exchanging means and the data access device, wherein the data block is specified by the virtual data block number in the data block management means and the data block allocation means; writing to the data block allocated by the data block allocation means is performed by the virtual disk management means; and available capacities of the respective storage media are externally displayed based on information from the data block management means and the virtual disk management means. Therefore, even in such a case, the unused quantity or the used quantity of the data blocks on each storage medium is known to the user. Consequently, when a file cannot extend over a plurality of storage media, the user can further know the largest file size which can be written.

According to a twelfth aspect of the present invention, the file management apparatus of the second aspect includes a virtual disk management means for managing sets of media numbers for identifying the storage media and data block numbers for identifying the data blocks on the respective storage media, and the corresponding virtual data block numbers for identifying the data blocks on all the storage media, converting, for a writing request to the data block specified by the virtual data block number, the virtual data block number of the requested data block into the corresponding media number and data block number, and performing writing to the data block with the obtained data block number on the storage medium with the obtained media number, using the storage media exchanging means and the data access device, wherein the data block is specified by the virtual data block number in the data block management means and the data block allocation means; writing to the data block allocated by the data block allocation means is performed by the virtual disk management means; and when an input specifying the storage medium for writing is given from the outside at the file writing, the specified storage medium is selected as a medium for writing, in place of the storage medium having the most unused data blocks. Therefore, in such a case, a storage medium for writing a file is specified by the user, whereby the user can select a storage medium for writing a file according to the frequency of access to the file and the storage capacity required for writing the file.

According to a thirteenth aspect of the present invention, a file management method is used in an information processor using a media exchange type storage device comprising a plurality of storage media, at least one data access device for recording and reproducing data to/from the storage media, and a storage media exchanging means for mounting and dismounting the arbitrary storage medium in/from the arbitrary data access device, as an external storage device, and the file management method includes a data block management process for dividing storage regions of the respective storage media into data blocks of fixed capacity and managing the use states of the divided data blocks; and a data block allocation process for allocating unused data blocks shown by the data block management process to a file to which a writing request from the information processor has been given, wherein data writing of the file to which the writing request has been given is performed to the data blocks allocated by the data block allocation process, using the storage media exchanging means and the data access device; and at the start of file writing, the storage medium having the most unused data blocks which are shown by the data block management process is selected as a disk to be written. Therefore, it is possible to create a file which is read with less exchange of storage media during the reading process. Further, even when the file size is unknown at the start of file writing, it is immediately proved that the file cannot be written to any other storage medium when a writing error occurs due to shortage of the capacity of the selected storage medium. Accordingly, the writing process of the file does not need to be retried.

According to a fourteenth aspect of the present invention, in the file management method of the thirteenth aspect, the data block allocation process limits the data blocks allocated to the file to which the writing request has been given to a range of the data blocks on the selected storage medium. Therefore, it is possible to create a file which is read without exchanging a storage medium during the reading process. Consequently, the file is readable at a constant access speed without suspending the reading process.

According to a fifteenth aspect of the present invention, in a recording medium containing a program for performing file management by a computer, which medium is readable by the computer, in an information processor using a media exchange type storage device comprising a plurality of storage media, at least one data access device for recording and reproducing data to/from the storage media, and a storage media exchanging means for mounting and dismounting the arbitrary storage medium in/from the arbitrary data access device, as an external storage device, file management processes in the program include a data block management process for dividing storage regions of the respective storage media into data blocks of fixed capacity and managing the use states of the divided data blocks, and a data block allocation process for allocating unused data blocks shown by the data block management process to a file to which a writing request from the information processor has been given; data writing of the file to which the writing request has been given is performed to the data blocks allocated by the data block allocation process, using the storage media exchanging means and the data access device; and at the start of file writing, the storage medium having the most unused data blocks which are shown by the data block management process is selected as a disk to be written. Therefore, it is possible to create a file which is read with less exchange of storage media during the reading process. Further, even when the file size is unknown at the start of file writing, it is immediately proved that the file cannot be written to any other storage medium when a writing error occurs due to shortage of the capacity of the selected storage medium. Accordingly, the writing process of the file does not need to be retried.

According to a sixteenth aspect of the present invention, in the recording medium of the fifteenth aspect containing the program including the file management processes, the data block allocation process limits the data blocks allocated to the file to which the writing request has been given to a range of the data blocks on the selected storage medium. Therefore, it is possible to create a file which is read without exchanging a storage medium during the reading process. Consequently, the file is readable at a constant access speed without. Suspending the reading process.

BRIEF DESCRIPTION OF THE DRAWINGS

FIG. 2 is a schematic diagram illustrating a data block management table in the file management apparatus according to the first embodiment of the invention.

FIG. 3 is a schematic diagram illustrating a file management table in the file management apparatus according to the first embodiment of the invention.

FIG. 4 is a schematic diagram illustrating a data block management table in the file management apparatus according to the first embodiment of the invention.

FIGS. 5(*a*) and 5(*b*) are schematic diagrams illustrating an optical disk management table by disk and an optical disk management table by drive, in the file management apparatus according to the first embodiment of the invention.

FIG. 18 is a schematic diagram illustrating a disk access management table in the file management apparatus according to the ninth embodiment of the invention.

FIG. 25 is a schematic diagram illustrating a disk access management table in the file management apparatus according to the eighth embodiment of the invention.

DETAILED DESCRIPTION OF THE PREFERRED EMBODIMENTS

Embodiment 1.

Figure 1:
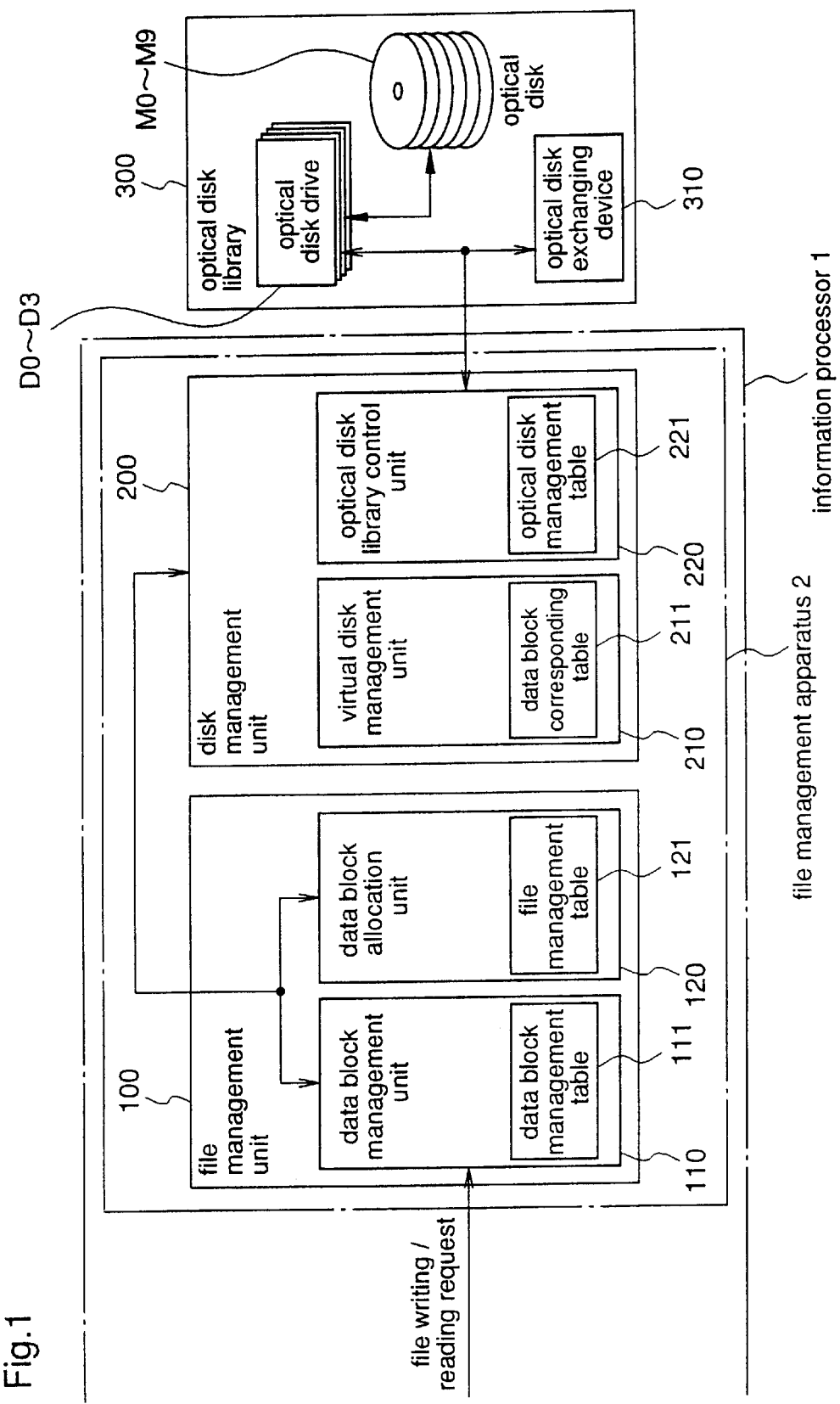
FIG. 1 is a block diagram illustrating a general construction of a file management apparatus in accordance with a first embodiment of the present invention.

FIG. 1 is a block diagram illustrating a general construction of a file management apparatus according to a first embodiment of the present invention. In FIG. 1, an information processor 1 has an optical disk library (media exchange type storage device) 300 as an external storage device, and includes a file management apparatus 2.

The optical disk library 300 includes optical disk drives D0 to D3 serving as data access devices, optical disks M0 to M9 serving as storage media, and an optical disk exchanging device (storage media exchanging means) 310 for mounting the optical disks in the optical disk drives D0 to D3 according to requests from the outside. In the first embodiment of the invention, the optical disk library having four optical disk drives and ten optical disks is used as an example.

The file management apparatus 2 comprises a file management unit 100 and a disk management unit 200. The file management unit 100 comprises a data block management unit 110 for managing data blocks and a data block allocation unit 120 for allocating data blocks to files. The disk management unit 200 comprises a virtual disk management unit 210 and an optical disk library control unit 220.

The data block management unit 110 has a data block management table 111. Storage regions of the optical disks M0 to M9 in the optical disk library 300 are divided into data blocks of prescribed fixed capacity, and the data block management unit 110 manages the use states of the divided data blocks using the data block management table 111. In file writing, the data block management unit 110 selects a storage medium having the most unused data blocks, and successively selects one from among the unused data blocks on the selected storage medium.

The data block allocation unit 120 has a file management table 121. Using the file managment table 121, the data block allocation unit 120 allocates an unused data block selected by the data block management unit 110 to a file to which a writing request has been given from another block (not shown) in the information processor 1.

The virtual disk management unit 210 has a data block corresponding table 211. Using the data block corresponding table 211, the virtual disk management unit 210 manages optical disk numbers, i.e., media numbers, M0 to M9, real data block numbers, i.e., data block numbers for identifying data blocks on the respective optical disks M0 to M9, and data block numbers, i.e., virtual data block numbers for identifying data blocks on all the optical disks M0 to M9, which optical. disk numbers, real data block numbers, and virtual data block numbers correspond to one another. For a writing/reading request to a data block specified by a data block number, the virtual disk management unit 210 converts the data block number of the requested data block into corresponding optical disk number and real data block number. Accordingly, the plurality of optical disks M0 to M9 are virtually treated as a single storage device.

The optical disk library control unit 220 has an optical disk management table 221. Using the optical disk management table 221, the optical disk exchanging device 310, and the optical disk drives D0 to D3, the optical disk library control unit 220 performs writing of a file to which a used data block has been allocated by the data block allocation unit 120 or reading of a file to which a reading request has been given from another block in the information processor 1 via the file management unit 100, to a data block specified by a real data block number and an optical disk number which have been converted by the virtual disk management unit 210.

In addition, the file management apparatus 2 comprises a computer. The file management unit 100, the data block management unit 110, the data block allocation unit 120, the disk management unit 200, the virtual disk management unit 210, and the optical disk library control unit 220 are realized by CPU of the computer. The data block management table 111, the file management table 121, the data block corresponding table 211, and the optical disk management table, 221 are realized by a main memory of the computer.

FIG. 2 is a schematic diagram illustrating the data block management table 111 which is supposed on the memory and used in the data block management unit 110. In the data block management table 111 shown in FIG. 2, a data block number of each data block corresponds to a use flag indicating whether the data block is used or not.

FIG. 3 is a schematic diagram illustrating the file management table 121 which is supposed on the memory and used in the data block allocation unit 120. In the file management table 121 shown in FIG. 3, a file name of each file corresponds to all data block numbers allocated to the file, i.e., a used data block number list.

FIG. 4 is a schematic diagram illustrating the data block management table 211 which is supposed on the memory and used in the virtual disk management unit 210. In the data block management table 211 shown in FIG. 4, an optical disk number of each optical disk, data block numbers of data blocks on the optical disk, and real data block numbers on the optical disk, i.e., a calculating expression of the real data block number, correspond to one another.

FIGS. 5(a) and 5(b) are schematic diagrams illustrating the optical disk management table 221 which is supposed on the memory and used in the optical disk library control unit 220. FIG. 5(a) shows the optical disk management table 221a by disk, and FIG. 5(b) shows the optical disk management table 221b by drive. In the optical disk management table 221a shown in FIG.(a), an optical disk number of each optical disk corresponds to a number of an optical disk drive in which the optical disk is currently mounted, or a number of a storage slot in which the optical disk is currently stored. In the optical disk management table 221b shown in FIG. 5(b), a number of each optical disk drive, an optical disk number of an optical disk which is currently mounted in the optical disk drive, and command accept time of the optical disk drive correspond to one another.

Figure 6:
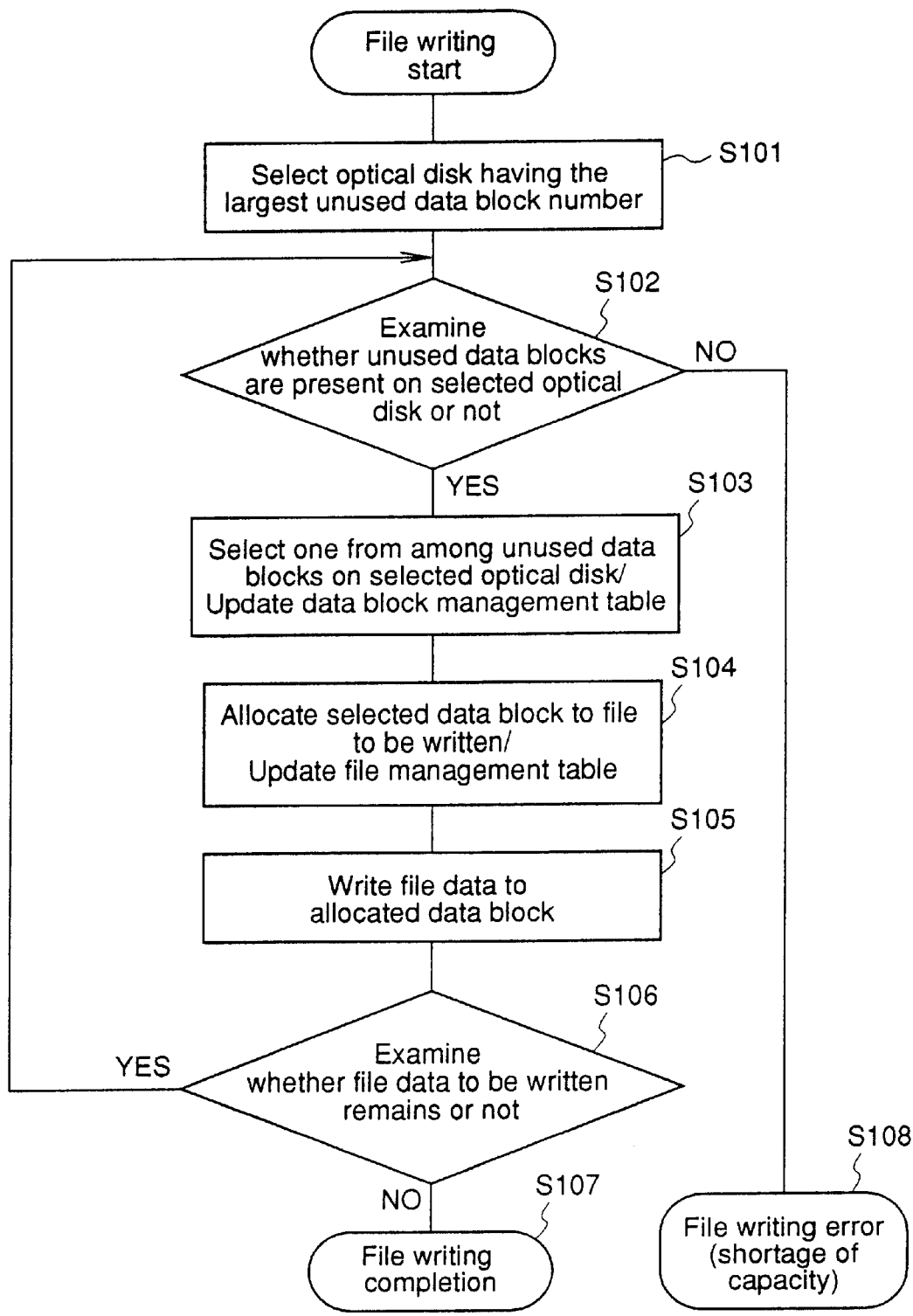
FIG. 6 is a flow chart showing the operation of the file management apparatus according to the first embodiment of the invention.

FIG. 6 is a flow chart showing the operation of the file management apparatus according to the first embodiment of the invention.

A description is given of the operation of the file management apparatus thus constructed, with reference to FIGS. 1 to 6.

In this case, the data block management table 111, the file management table 121, the data block corresponding table 211, and the optical disk management table 221 are currently in the states shown in FIGS. 2, 3, 4, and 5(a) and 5(b), respectively. It is supposed that the unused data blocks shown by the data block management table 111 in FIG. 2 are most in the optical disk M0, and a writing request is given to the file 3 shown by the file management table 121 in FIG. 3.

When writing of a file is requested, the file management unit 100 receives the writing request of the file. At step S101, using information of the data block management table 111, and relationships between the data block numbers and the optical disk numbers which have been previously obtained from the data block corresponding table 211 in the virtual disk management unit 210, the data block management unit 110 selects an optical disk having the most unused data blocks. In this case, since the unused data blocks on the optical disk M0 are most, the optical disk M0 is selected.

Next, at step S102, the data block management unit 110 examines whether unused data blocks are present or not in a range of the numbers (0 to 999) of the data blocks on the selected optical disk M0, using the data block management table 111.

When no unused data blocks are present, no file can be stored. Therefore, the writing process is completed as a file writing error due to shortage of the capacity (step S108). when the unused data blocks are present, step S103 is executed. The data block management unit 110 selects one from among the unused data blocks in a range of the numbers (0 to 999) of the data blocks on the optical disk M0, and updates the data block management table 111, i.e., changes the use flag of the selected unused data block to "used". In this case, for example, the data block with the number "2" is selected from the data block management table 111 shown in FIG. 2, and the use flag of the data block with the number "2" is changed to "used".

Then, at step S104, the data block allocation unit 120 allocates the selected data block as a data storage block for the file to be written, and updates the file management table 121. In this case, the file 3 is additionally written. In the file management table 121 shown in FIG. 3, the data block number "2" of the data block selected at step S103 is added to the used data block number list of the file 3, and the used data block number list of the file 3 is changed to "4, 2". When a new file which has been not recorded in the file management table 121, for example, a file 10, is written, a new field for the file 10 is created in the file management table 121, and a used data block number list of the field is made "2".

Subsequently, at step S105, the file management unit 100 instructs the disk management unit 200 to write the file data to the allocated data block. When the disk management unit 200 receives this instruction, using the data block corresponding table 211, the disk management unit 200 obtains the optical disk number of the optical disk having the data block to which the file data is to be written, and calculates a real data block number of the data block on the optical disk, by the virtual disk management unit 210.

In this case, since the data block with the number "2" is on the optical disk M0, the real data block number of the data block on the optical disk is "2" (2−0=2).

Then, using the optical disk management table 221, the disk management unit 200 selects an optical disk drive used in file data writing by the optical disk library control unit 220, and instructs the optical disk library 300 to mount the optical disk for file writing in the selected optical disk drive. When the optical disk library 300 receives this instruction, the optical disk library 300 mounts the optical disk in the optical disk drive according to the instruction, by the optical disk exchanging device 310.

At this time, the disk management unit 200 first examines whether the optical disk for file writing is mounted in any of the optical disk drives or not. When the optical disk for file writing has been mounted in the optical disk drive, that optical disk drive is selected and the optical disk is left as it is. When the optical disk for file writing is mounted in none of the optical disk drives, the disk management unit 200 finds out and selects the optical disk drive in which no other optical disk is mounted, and instructs the optical disk library 300 to mount the optical disk for file writing in the selected optical disk drive. If the disk management unit 200 does not find out the optical disk drive in which no other optical disk is mounted, the disk management unit 200 selects the optical disk drive Slaving the oldest command accept time, and instructs the optical disk library 300 to return the optical disk mounted in the selected optical disk drive to its storage slot and then to mount the optical disk for file writing in the selected optical disk drive.

In this case, in the optical disk management tables 221a and 221b shown in FIGS. 5(*a*) and 5(*b*), the optical disk M0 is stored in the storage slot 0, and the optical disk drives D2 and D3 in which no other optical disks are mounted are present. For example, the optical disk drive D2 is selected and the optical disk M0 is mounted in the optical disk drive D2.

Thereafter, using the optical disk drive D2, the disk management unit 200 writes the data of the file 3 to the data block with the real data block number "2" on the optical disk M0 which is mounted in the optical disk drive D2, by the optical disk library control unit 220.

Then, at step S106, the file management unit 100 examines whether the data of the file 3 to be further written remains or not.

When the data to be written remains, the writing process returns to step S102, and block allocation/file writing processes at steps S102 to S106 are repeated until all the data is written.

When no data to be written remains, the writing process of the file 3 is completed (S107).

As described above, in the first embodiment of the invention, an optical disk having the most unused data blocks is selected at the start of file writing, whereby data blocks to be allocated to the file are limited to a range of the data blocks on the selected optical disk. Therefore, it is possible to create a file which is read without exchanging an optical disk during the reading process. Consequently, the file is readable at a constant access speed without suspending the reading process.

Further, since the optical disk having the most unused data blocks is selected, even when the file size is unknown at the start of file writing, it is immediately proved that the file cannot be written to any other optical disk when a writing error occurs due to shortage of the capacity of the selected optical disk. Accordingly, the writing process of the file does not need to be retried.

Embodiment 2.

A second embodiment of the present invention is different from the first embodiment in that a file can extend over a plurality of optical disks.

A general construction of a file management apparatus according to the second embodiment is the same as in the first embodiment, except That the data block management unit 110 is constructed so as to perform the following operation.

More specifically, in the second embodiment of the invention, as shown in FIG. 6, step S101 is executed and steps S102 to S106 are repeated as in the first embodiment. Thereafter, when the unused data blocks on the selected optical disk are used up, the data block management unit 110 again selects another optical disk at step S101. Then, the remaining data of the file is written to the second-selected optical disk, whereby the file extending over the plurality of optical disks is created.

By using such a construction, the file data is written to the first-selected optical disk as much as possible, and the remaining data is written to the second-selected optical disk. Therefore, it is possible to create a file which is read with less exchange of optical disks during the reading process.

Further, since the optical disk having the most unused data blocks is selected, even when the file size is unknown at the start of file writing, it is immediately proved that the file cannot be written to any other optical disk when a writing error occurs due to shortage of the capacity of the selected optical disk. Accordingly, the writing process of the file does not need to be retried.

Embodiment 3.

Figure 7:
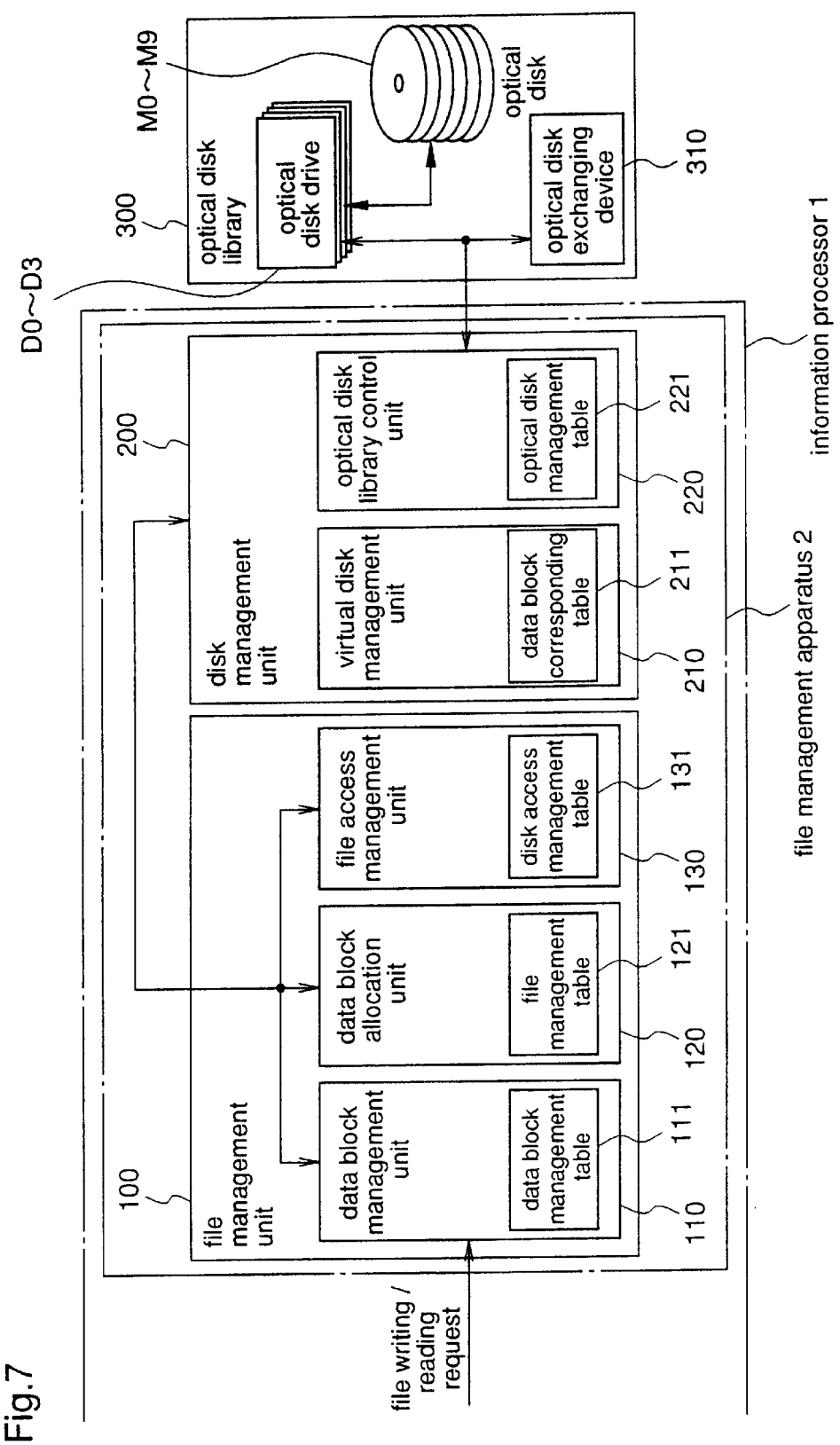
FIG. 7 is a block diagram illustrating a general construction of a file management apparatus in accordance with a third embodiment of the present invention.

FIG. 7 is a block diagram illustrating a general construction of a file management apparatus according to a third embodiment of the present invention. In FIG. 7, the same reference numerals as those in FIG. 1 designate the same or corresponding parts. The third embodiment of the present invention is different from the first embodiment in that the file management unit 100 has a file access management unit (a file writing detection means and a media writing management means) 130 for detecting file writing and managing the writing states of storage media, in addition to the data block management unit 110 and the data block allocation unit 120.

The file access management unit 130 has a disk access management table 131, and detects the start and completion of file writing and manages the presence of writing to the optical disks M0 to M9 in the optical disk library 300, using the disk access management table 131 based on information from the data block management unit 110.

Figure 8:
FIG. 8 is a schematic diagram illustrating a disk access management table in the file management apparatus according to the third embodiment of the invention.

FIG. 8 is a schematic diagram illustrating the disk access management table 131 which is supposed on the memory and used in the file access management unit 130. In the disk access management table 131 shown in FIG. 8, an optical disk number of each optical disk corresponds to the access state of the optical disk.

Figure 9:
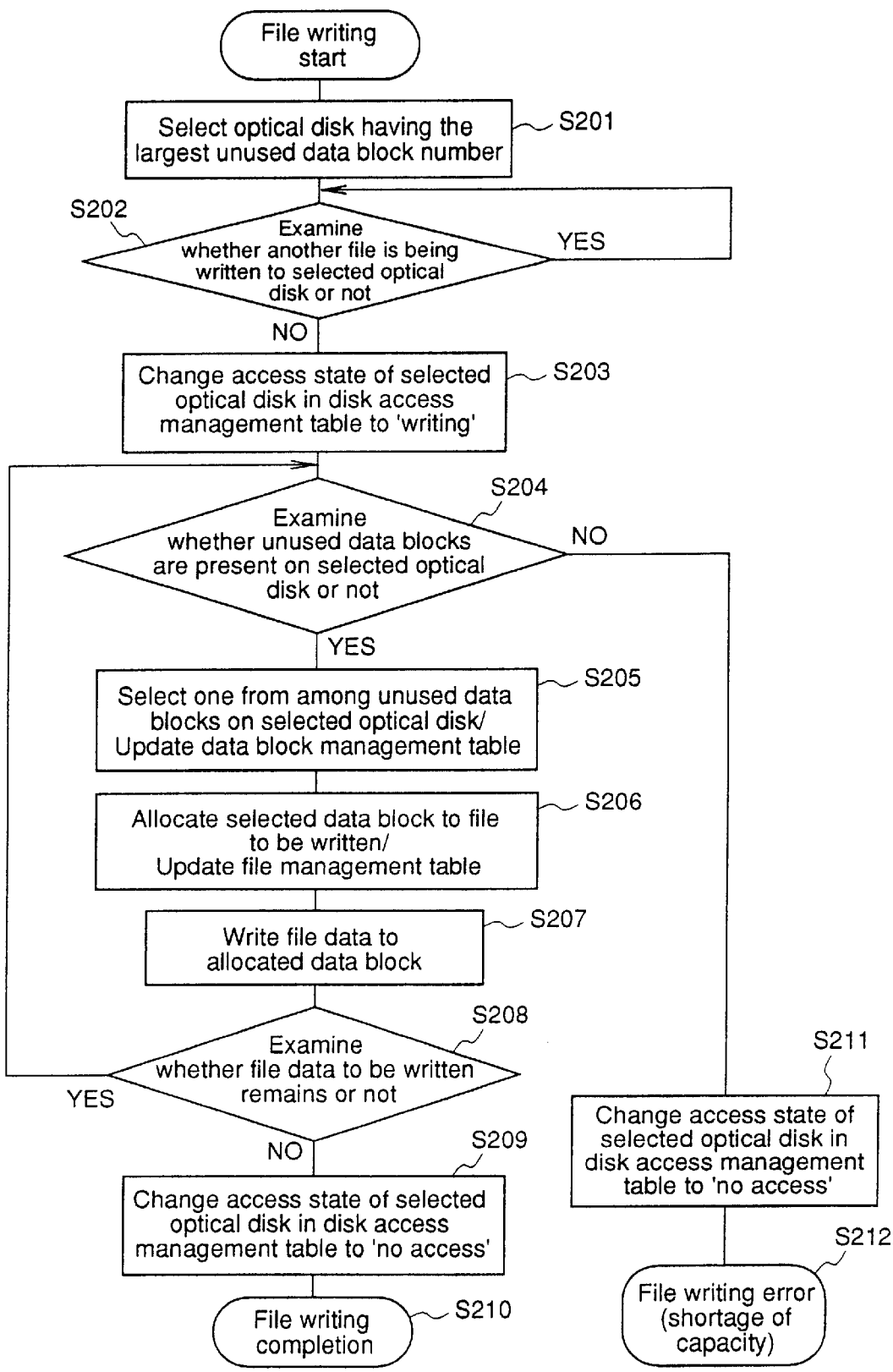
FIG. 9 is a flow chart showing the operation of the file management apparatus according to the third embodiment the invention.

FIG. 9 is a flow chart showing the operation of the file management apparatus according to the third embodiment of the invention.

A description is given of the operation of the file management apparatus thus constructed, with reference to FIGS. 2 to 9.

In this case, the data block management table 111, the file management table 121, the data block corresponding table 211, and the optical disk management table 221 are currently in the states different from those in the first embodiment, respectively. It is supposed that the unused data blocks shown by the data block management table 111 in FIG. 2 are most in the optical disk M0, and the disk access management table 131 is currently in the state shown in FIG. 8.

When writing of a file is requested, the file management unit 100 receives the writing request of the file. At step S201, as in the first embodiment, the data block management unit 110 selects an optical disk having the most unused data blocks. In this case, the optical disk M0 is selected.

Next, at step 202, the file access management unit 130 examines the access state of the selected optical disk using the disk access management table 131.

If another file is being written to tho selected optical disk, the later writing process is suspended and step S202 is repeated. After writing another file, the next step is executed.

In this case, since no file is being written to the selected optical disk M0, the writing processes proceeds to step S203. The file access management unit 130 updates the disk access management table 131, i.e., changes the access state of the optical disk M0 to "writing".

Then, at step S204, as in the first embodiment, the data block management unit 110 examines whether unused data blocks are present or not in a range of the numbers (0 to 999) of the data blocks on the selected optical disk M0, using the data block management table 111.

When no unused data blocks are present, step S211 is executed. The file access management unit 130 changes the access state of the optical disk M0 in the disk access management table 131 to "no access". Thereafter, the writing process is completed as a file writing error due to shortage of the capacity (step S212).

In this case, the unused data blocks are present. Therefore, similar to the file data writing process from step S102 to step S106 described in the first embodiment, a file data writing process from step S204 to step S208 is repeated. When no file data to be written remains at step S208, the writing process proceeds to step S209.

At step S209, the file access management unit 130 changes the access state of the optical disk M0 in the disk access management table 131 to "no access", thereby completing the file writing process (step S210).

In the above description, a file cannot extend over a plurality of optical disks. In FIG. 9, however, when the unused data blocks on the selected optical disk are used up at step S204, after the access state of the selected optical disk is changed to "no access" at step S211, another optical disk is selected again at step S201, whereby a file extending over a plurality of optical disks can be created.

As described above, in the third embodiment of the invention, the file management unit 100 has the file access management unit 130 for managing the access states of the respective optical disks, and writing of a file is temporarily suspended when another file is being written to an optical disk to which the file is to be written. Therefore, when plural file writing processes to one optical disk coexist, data block allocation to a file is not performed until writing of another file which has been first started is completed, whereby the files do not scramble for the data blocks. Consequently, even when there is not enough capacity for writing all the files, it is possible to decrease the number of data blocks which result in being wasted because parts of the files are written to the optical disk and the optical disk becomes short of the capacity, as compared with the case where the data blocks are allocated in parallel to the plural files.

Also in a case of a file extending over a plurality of optical disks, when plural file writing processes to one optical disk coexist, the files do not scramble for data blocks as described above. Consequently, even when there is not enough capacity for writing all the files, it is possible to decrease the number of files which result in extending over a plurality of optical disks because parts of the files are written to the first optical disk and the optical disk becomes short of the capacity, as compared with the case where the data blocks are allocated to the plural files in parallel.

In addition, paying attention to one file, a file which has first started a writing process is given priority in that data block allocation. Therefore, more data blocks are allocated to one file as compared with the case where the data blocks are allocated to plural file. in parallel, whereby it is possible to create a file which is read with less exchange of optical disks during the reading process.

Embodiment 4.

A general construction of a file management apparatus according to a fourth embodiment of the present invention is shown in FIG. 7. The fourth embodiment of the invention is different from the third embodiment in that the file access management unit 130 is constructed so that when data blocks on an optical disk to which a file is being written, shown in the disk access management table 131, are allocated for writing a new file by the data block allocation unit 120, the new file writing is aborted.

Figure 10:
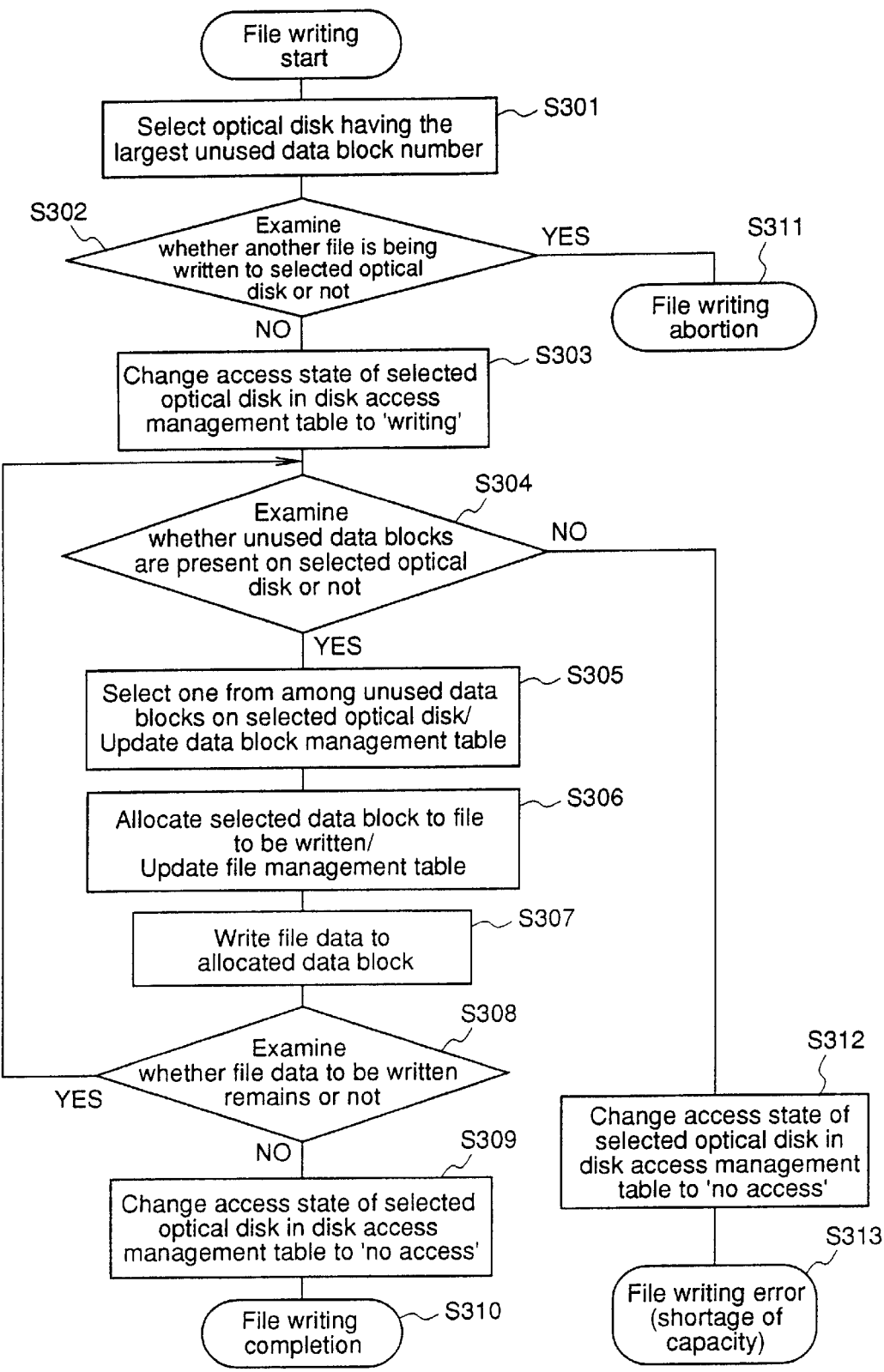
FIG. 10 is a flow chart showing the operation of a file management apparatus in accordance with a fourth embodiment of the present invention.

FIG. 10 is a flow chart showing the operation of the file management apparatus according to the fourth embodiment of the invention.

A description is given of the operation of the file management apparatus thus constructed, with reference to FIG. 10.

In the fourth embodiment of the invention, except the case where a file is being written to the selected optical disk at step S302 shown in FIG. 10, all the other processes are identical to those in the third embodiment, and no description is given thereof.

At step S302, when a file is being written to the selected optical disk, the file access management unit 130 aborts new file writing (step S311).

In the above description, a file cannot extend over a plurality of optical disks. As in the third embodiment, however, a file extending over a plurality of optical disks can be created.

As described above, in the fourth embodiment of the invention, the file management unit 100 has the file access management unit 130 for managing the writing states of the respective optical disks, and writing of a new file is aborted when a file is being written to an optical disk to which the new file is to be written. Therefore, when plural file writing processes to one optical disk coexist, writing of a new file is aborted until writing of a file which has been first started is completed, whereby the files do not scramble for the data blocks. Consequently, even when there is not enough capacity for writing all the files, it is possible to decrease the number of data blocks which result in being wasted because parts of the files are written to the optical disk and the optical disk becomes short of the capacity, as compared with the case where the data blocks are allocated to the plural files in parallel.

Further, when the new file writing is resumed after the abortion, the number of unused data blocks on each optical disk changes due to the previous file writing. Accordingly, an optical disk having the unused data blocks after the change is selected.

As a result, the effects obtained in the first embodiment are also obtained when the plural file writing processes to one optical disk coexist.

In addition, in the fourth embodiment of the invention, when a file is being written to the selected optical disk at step S302 shown in FIG. 10, the new file writing is aborted. In this case, however, the writing process returns to step S301, and another optical disk may be selected again.

Embodiment 5.

A general construction of a file management apparatus according to a fifth embodiment of the present invention is shown in FIG. 7. The fifth embodiment of the invention is different from the third embodiment in that the disk access management table 131 shows the reading states as the access states, and the file access management unit (a file reading detection means and a media reading management means) 130 detects the start and completion of file reading, manages the presence of writing to the optical disks M0 to M9 in the optical disk library 300, using the disk access management table 131 based on information from the data block management unit 110, and is constructed so that when data blocks on an optical disk from which a file is being read, shown in the disk access management table 131, are allocated to a new file to be written by the data block allocation unit 120, the new file writing is temporarily suspended.

Figure 11:
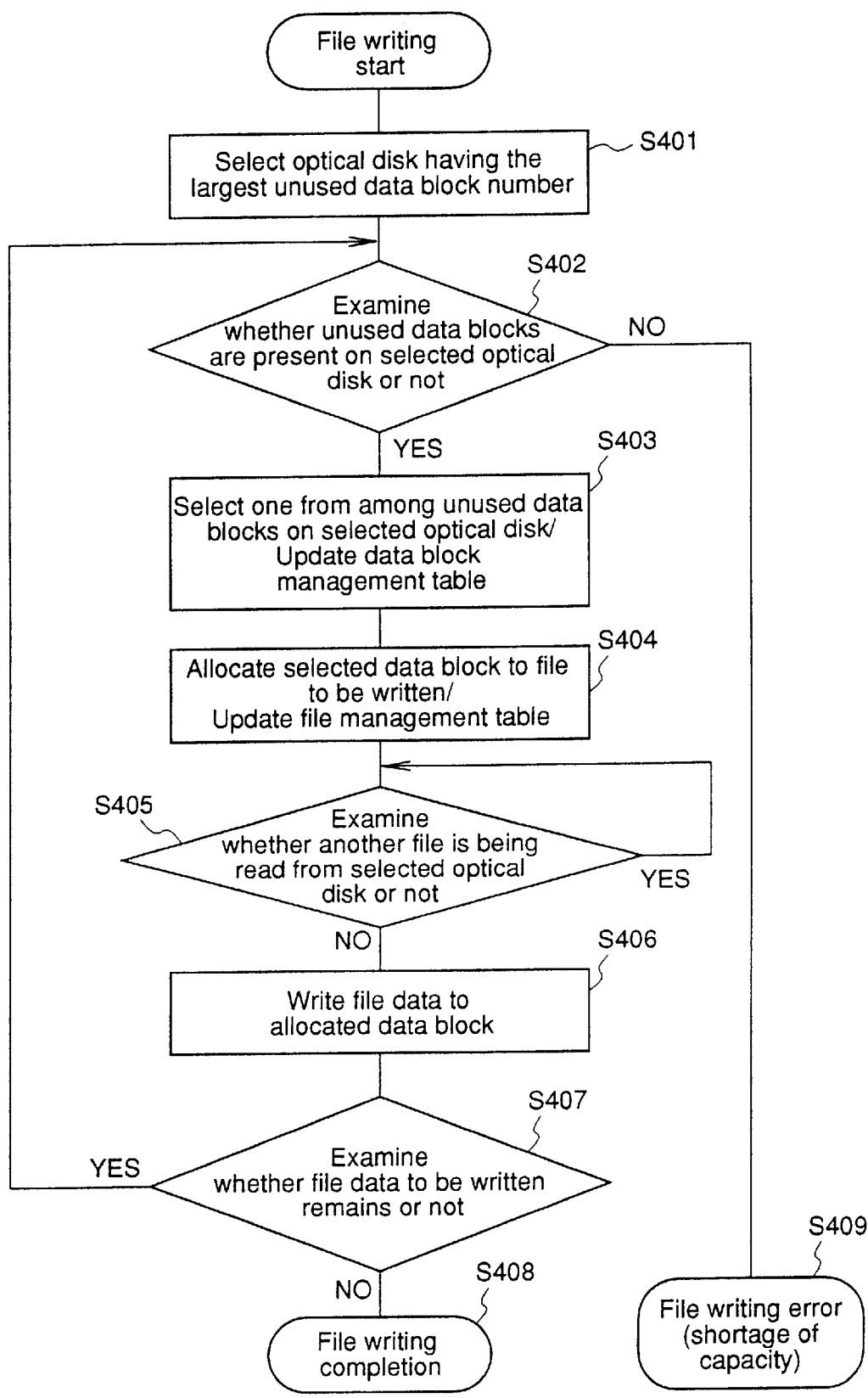
FIG. 11 is a flow chart showing the operation of a file management apparatus in accordance with a fifth embodiment of the present invention.

FIG. 11 is a flow chart showing the operation of the file management apparatus according to the fifth embodiment of the invention.

A description is given of the operation of the file management apparatus thus constructed, with reference to FIG. 11.

In the fifth embodiment of the invention, except a process at step S405 shown in FIG. 11, all the other processes are identical to those in the first embodiment, and no description is given thereof.

At step S405, the file access management unit 130 examines the access state of the selected optical disk to which the new file is to be written using the disk access management table 131.

When a file is being read from the selected optical disk, the writing process is suspended and step S405 is repeated until the file is read. When no file is being read from the selected optical disk, the writing process proceeds to step S406 and the following processes are performed.

In the above description, a file cannot extend over a plurality of optical disks. In FIG. 11, however, when the unused data blocks on the selected optical disk are used up at step S402, another optical disk is selected again at step S401, whereby a file extending over a plurality of optical disks can be created.

As described above, in the fifth embodiment of the invention, the file management unit 100 has the file access management unit 130 for managing the reading states of the respective optical disks, and writing of a new file is temporarily suspended when a file is being read from an optical disk to which the new file is to be written, whereby the previous reading process is not impeded. Therefore, when file reading and file writing coexist, an access speed for the reading can be kept constant without being disturbed by the writing.

Embodiment 6.

Figure 12:
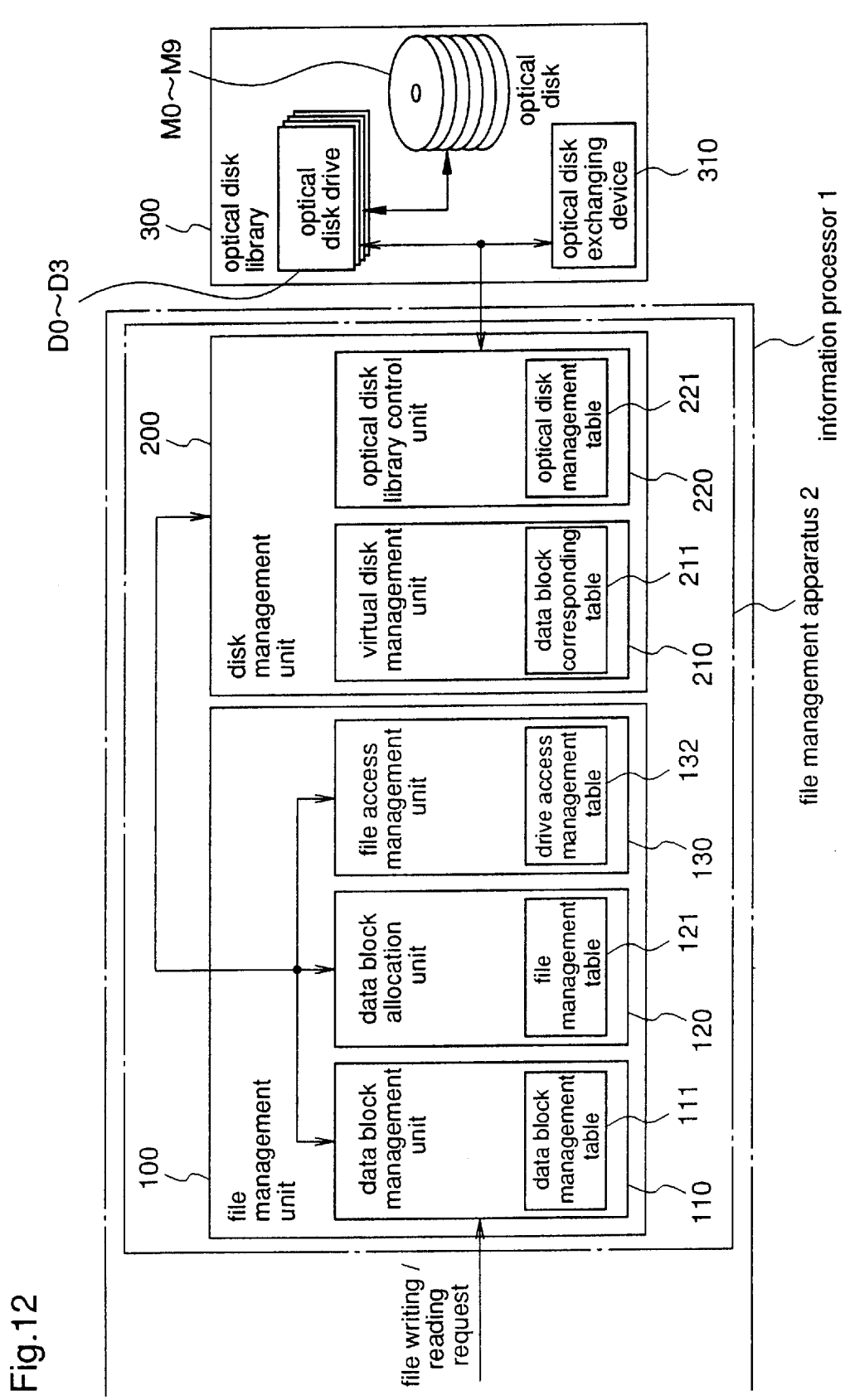
FIG. 12 is a block diagram illustrating a general construction of a file management apparatus in accordance with a sixth embodiment of the present invention.

FIG. 12 is a block diagram illustrating a general construction of a file management apparatus according to a sixth embodiment of the present invention. In FIG. 12, the same reference numerals as those in FIG. 1 designate the same or corresponding parts. The sixth embodiment of the present invention is different from the first embodiment in that the file management unit 100 has a file access management unit (a file access detection means and a data access device management means) 130 for detecting file access and managing data access devices, in addition to the data block management unit 110 and the data block allocation unit 120.

The file access management unit 130 has a drive access management table 132, and detects the start and completion of file access and controls file writing according to the use states of the optical disk drives, using the drive access management table 132.

Figure 13:
FIG. 13 is a schematic diagram illustrating a drive access management table in the file management apparatus according to the sixth embodiment of the invention.

FIG. 13 is a schematic diagram illustrating the drive access management table 132 which is supposed on the memory and used in the file access management unit 130. In the drive access management table 132 shown in FIG. 13, a drive number of each optical disk drive corresponds to the use state of the optical disk drive.

Figure 14:
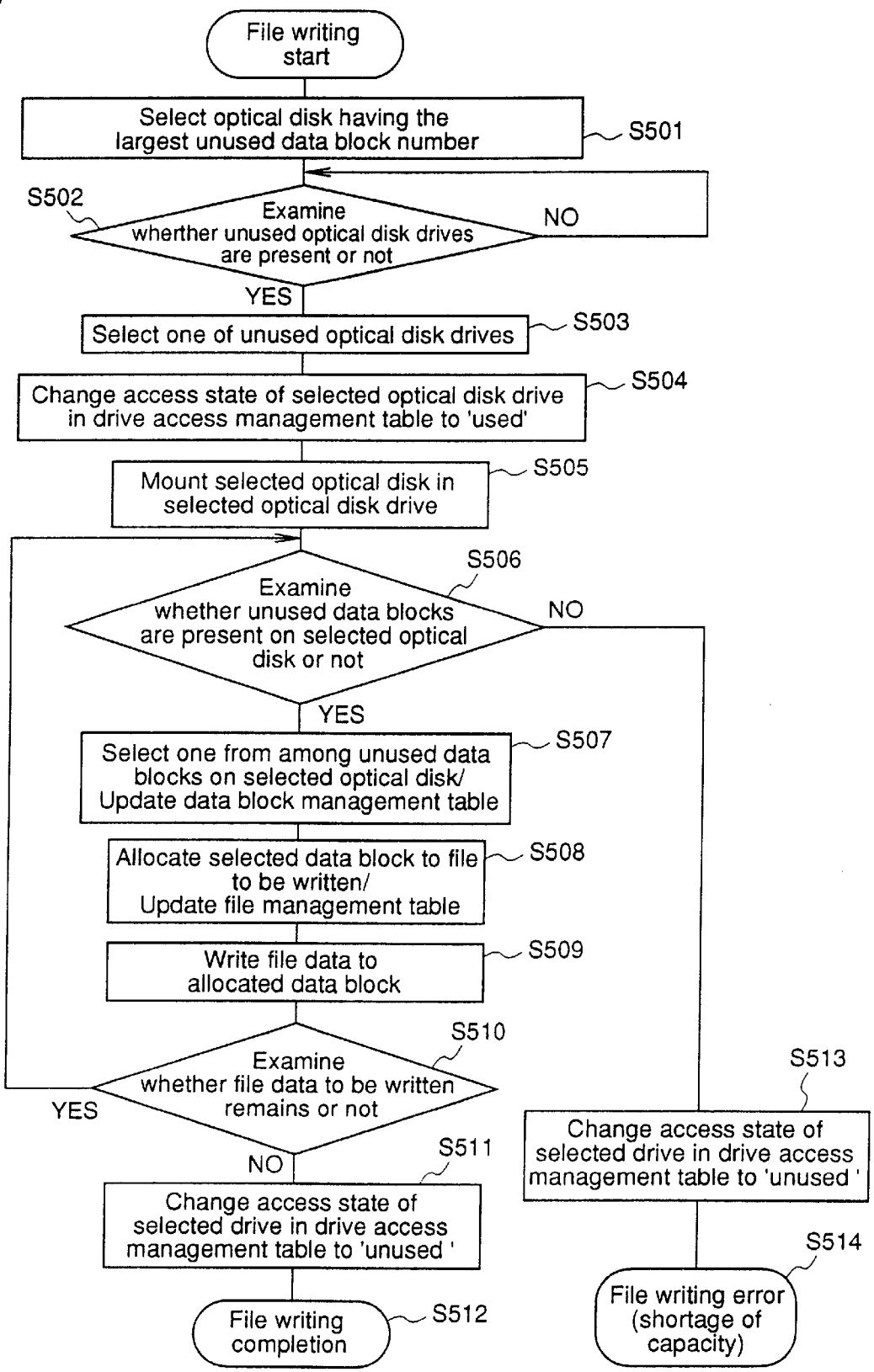
FIG. 14 is a flow chart showing the operation of the file management apparatus according to the sixth embodiment of the invention.

FIG. 14 is a flow chart showing the operation of the file management apparatus according to the sixth embodiment of the invention.

A description is given of the operation of the file management apparatus thus constructed, with reference to FIGS. 2 to 5(a) and 5(b), 13 and 14.

In this case, the drive access management table 132 is currently in the state shown in FIG. 13, and the other management tables in the file management apparatus are the same as in the first embodiment.

When writing of a file is requested, the file management unit 100 receives the writing request of the file. At step S501, as in the first embodiment, the data block management unit 110 selects the optical disk M0 having the most unused data blocks.

Next, at step 502, the file access management unit 130 examines the presence of unused optical disk drives using the drive access management table 132.

If all the optical disk drives are used, step S502 is repeated until one of the optical disk drives becomes unused.

In this case, since the unused optical disk drives D2 and D3 are present, the writing process proceeds to step S503 and one of the unused optical disk drives is selected. The method described in the first embodiment may be used as a selection method when a plurality of unused optical disk drives are present. In this case, for example, the optical disk drive D2 is selected.

Subsequently, at step S504, the file access management unit 130 updates the drive access management table 132, i.e., changes the access state of the selected optical disk drive D2 to "used".

Then, at step S505, the file management unit 100 instructs the optical disk exchanging device 310 in the optical disk library 300 to mount the selected optical disk M0 in the selected optical disk drive D2, via the optical disk library control unit 220 in the disk management unit 200. The optical disk exchanging device 310 performs mounting according to this instruction.

Then, at step S506, as in the first embodiment, the data block management unit 110 examines whether unused data blocks are present or not in a range of the numbers (0 to 999) of the data blocks on the selected optical disk M0, using the data block management table 111.

If no unused data blocks are present, step S513 is executed. The file access management unit 130 changes the access state of the optical disk drive D2 in the drive access management table 132 to "unused". Thereafter, the writing process is completed as a file writing error due to shortage of the capacity (step S514).

In this case, since the unused data blocks are present, similar to the file data writing process from step S102 to step S106 described in the first embodiment, a file data writing process from step S506 to step S510 is repeated until all the data is written. When no file data to be written remains at step S510, the writing process proceeds to step S511.

At step S511, the file access management unit 130 changes the access state of the optical disk drive D2 in the drive access management table 132 to "unused", thereby completing the file writing process from step S512).

In the above description, a file cannot extend over a plurality of optical disks. In FIG. 14, however, when the unused data blocks on the selected optical disk are used up at step S506, after the access state of the selected optical disk drive is changed to "unused" at step S513, another optical disk is selected again at step S501, whereby a file extending over a plurality of optical disks can be created.

As described above, in the sixth embodiment of the invention, the file management unit 100 has the file access management unit 130 for managing the access states of the respective optical disk drives, and writing of a file is temporarily suspended when no optical disk drives which can be used for the writing are present, whereby the previous accesses are not impeded. Therefore, when file reading and file writing coexist, an optical disk from which a file is being read is not dismounted from an optical disk drive used for the reading and an optical disk to which a file is to be written is not mounted therein. Consequently, an access speed for the reading can be kept constant without being interrupted.

In addition, when plural file writing processes coexist, exchange of optical disks for writing files is not performed until writing processes of other files which have been first started are completed, whereby the files do not scramble for the optical disk drives. Accordingly, it is possible to decrease the exchange of optical disks which is performed until all the files are written and to shorten time required for the writing processes.

Also in a case of a file extending over a plurality of optical disks, an access speed for reading can be kept constant, and time required for writing can be shortened.

Embodiment 7.

A general construction of a file management apparatus according to a seventh embodiment of the present invention is shown in FIG. 7. The seventh embodiment of the present invention is different from the third embodiment in that the file management unit 100 is constructed so that an optical disk having the most unused data blocks is selected from among optical disks to which no files are being written, at the start of file writing.

Figure 15:
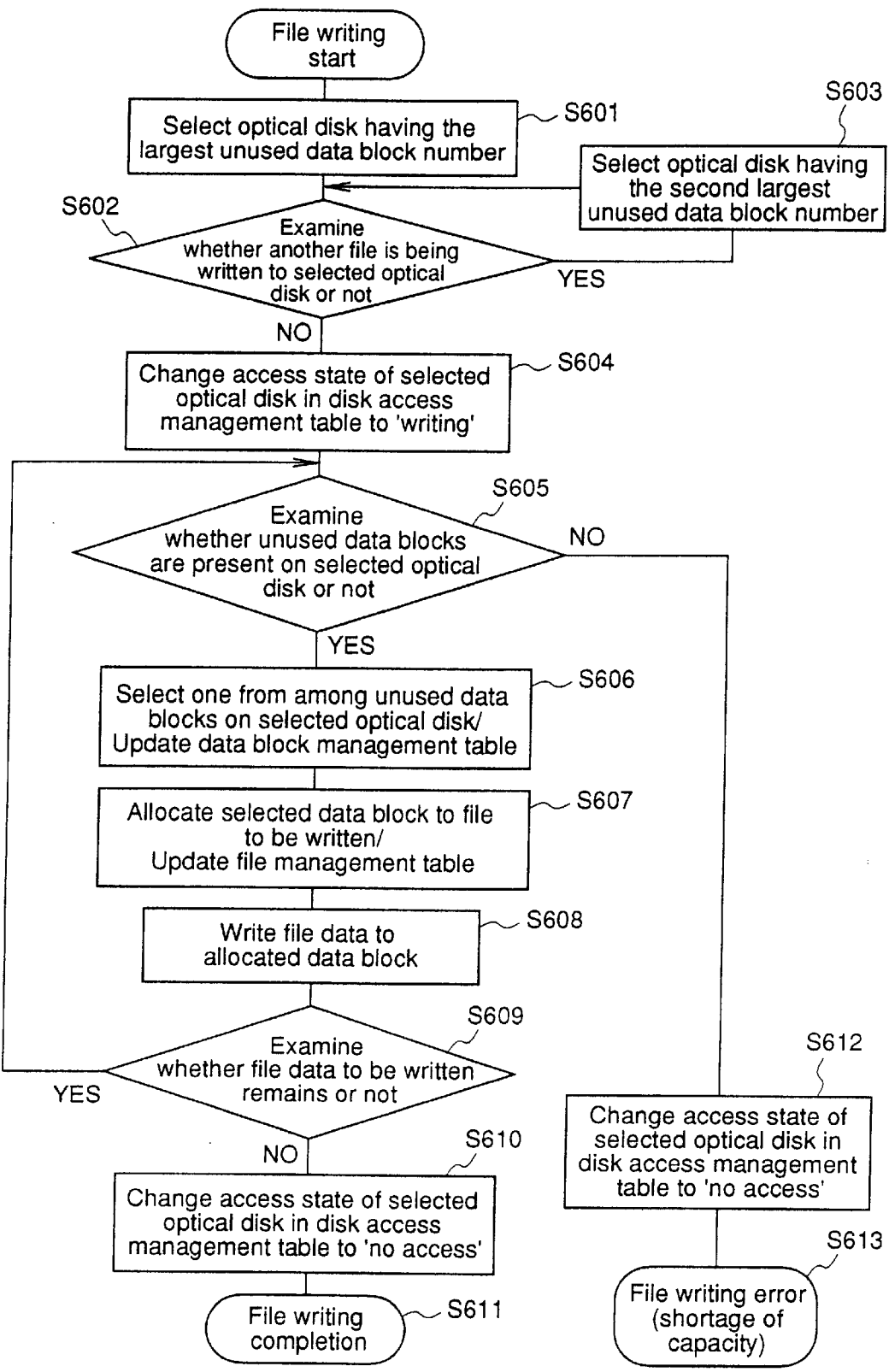
FIG. 15 is a flow chart showing the operation of a file management apparatus in accordance with a seventh embodiment of the present invention.

FIG. 15 is a flow chart showing the operation of the file management apparatus according to the seventh embodiment of the invention.

A description is given of the operation of the file management apparatus thus constructed, with reference to FIGS. 2 to 5(a) and 5(b), 7, 8 and 15.

In this case, the file management apparatus is currently in the state identical to that in the third embodiment, except that in the data block management table 111 shown in FIG. 2, the optical disk M3 has the most unused data blocks and the optical disk M0 has the second most unused data blocks.

When writing of a file is requested, the file management unit 100 receives the writing request of the file. At step S601, as in the third embodiment, the data block management unit 110 selects an optical disk having the most unused data blocks. In this case, since the unused data blocks on the optical disk M3 are most, the optical disk M3 is selected.

Next, at step S602, as in the third embodiment, the file access management unit 130 examines the access state of the selected optical disk using the disk access management table 131.

If no file is being written to the selected optical disk, the writing process proceeds to step S604.

In this case, since another file is being written to the selected optical disk M3 as shown in FIG. 8, step S603 is executed. At step S603, using information of the data block management table 111, and relationships between the data block numbers and the optical disk numbers which have been previously obtained from the data block corresponding table 211 in the virtual disk management unit 210, the data block management unit 110 selects an optimal disk having the second most unused data blocks. Thereafter, the writing process returns to step S602.

In this way, step S602 and step S603 are repeated until an optical disk to which no file is being written is found.

In this case, since no file is being written to the optical disk M0 having the second most unused data blocks, the optical disk M0 is selected and the writing process proceeds to step S604.

The following processes at steps S604 to S613 are identical to these at steps S203 to S212 described in the third embodiment, and no description is given thereof.

In the above description, a file cannot extend over a plurality of optical disks. In FIG. 15, however, when the unused data blocks on the selected optical disk are used up at step S605, after the access state of the selected optical disk is changed to "no access" at step S612, another optical disk is selected again at step S601, whereby a file extending over a plurality of optical disks can be created.

As described above, in the seventh embodiment of the invention, the file management unit 100 has the file access management unit 130 for managing the access states of the respective optical disks, and at the start of file writing, an optical disk having the most unused data blocks is selected as an optical disk for file writing, from among optical disks to which no files are being written. Therefore, when plural file writing processes coexist, a file is written to an optical disk different from an optical disk to which writing of another file that has been first started is being performed. Therefore, the files do not scramble for data blocks on one optical disk, and the files are written in parallel when the optical disk library has a plurality of optical disk drives, whereby time required for the file writing processes can be shortened.

Also in a case of a file extending over a plurality of optical disks, files does not scramble for data blocks on one optical disk and the files are written in parallel, whereby time required for the file writing processes can be shortened.

Embodiment 8.

A general construction of a file management apparatus according to an eighth embodiment of the present invention is shown in FIG. 7. The eighth embodiment of the present invention is different from the first embodiment in the following points. The file management unit 100 has a file access management unit 130 for detecting file reading and managing the reading states of storage media, in addition to the data block management unit 110 and the data block allocation unit 120. The file access management unit 130 has a disk access management table 131 shown in FIG. 25, and detects the start and completion of file reading and manages the presence of reading from the optical disks M0 to M9 in the optical disk library 300, using the disk access management table 131 based on information from the data block management unit 110. The file management unit 100 is constructed so that an optical disk having the most unused data blocks is selected from among optical disks from which no files are being read, at the start of file writing.

FIG. 25 is a schematic diagram illustrating the disk access management table 131 used in the file access management unit 130 according to the eighth embodiment of the invention. In FIG. 25, the same reference characters as shown in FIG. 8 denote the same or corresponding parts, and the disk access management table 131 according to the eighth embodiment is identical to that shown in FIG. 8, except that files are being read from the optical disks M3 and M7.

Figure 16:
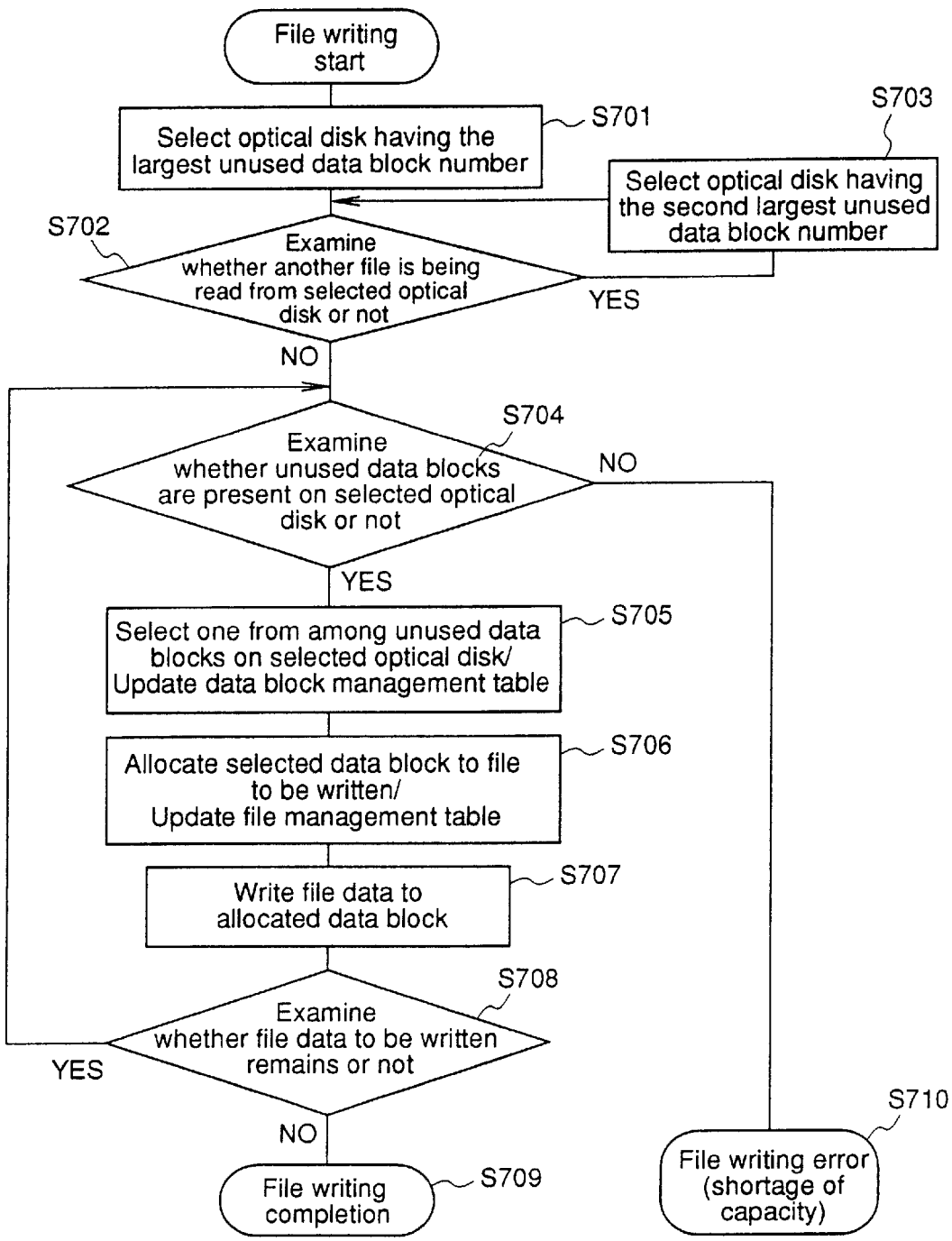
FIG. 16 is a flow chart showing the operation of a file management apparatus in accordance with an eighth embodiment of the present invention.

FIG. 16 is a flow chart showing the operation of the file management apparatus according to the eighth embodiment of the invention.

A description is given of the operation of the file management apparatus thus constructed, with reference to FIGS. 2 to 5(a) and 5(b), 7, 25 and 16.

In this case, the data block management table 111, the file management table 121, the data block corresponding table 211, and the optical disk management table 221 are currently in the states different from those in the first embodiment, respectively. It is supposed that the unused data blocks shown by the data block management table 111 in FIG. 2 are most in the optical disk M3 and the unused data blocks are second most in the optical disk M0, and files are being read from the optical disks M3 and M7 as shown by the disk access management table 131 in FIG. 25.

When writing of a file is requested, the file management unit 100 receives the writing request of the file. At step S701, the data block management unit 110 selects an optical disk having the most unused data blocks. In this case, since the unused data blocks on the optical disk M3 are most, the optical disk M3 is selected.

Next, at step S702, the file access management unit 130 examines the access state of the selected optical disk using the disk access management table 131.

If no file is being read from the selected optical disk, the writing process proceeds to step S704.

In this case, since another file is being read from the selected optical disk M3, step S703 is executed. At step 3703, using information of the data block management table 111, and relationships between the data block numbers and the optical disk numbers which have been previously obtained from the data block corresponding table 211 in the virtual disk management unit 210, the data block management unit 110 selects an optical disk having the second most unused data blocks. Thereafter, the writing process returns to step S702.

In this way, step S702 and step S703 are repeated until an optical disk to which no file is being read is found.

In this case, since no file is being written to the optical disk M0 having the second most unused data blocks, the optical disk M0 is selected and the writing process proceeds to step S704.

The following processes at steps S704 to S710 are identical to those at steps S102 to 5108 described in the first embodiment, and no description is given thereof.

In the above description, a file cannot extend over a plurality of optical disks. In FIG. 16, however, when the unused data blocks on the selected optical disk are used up at step S704, another optical disk is selected again at step S701, whereby a file extending over a plurality of optical disks can be created.

As described above, in the eighth embodiment of the invention, the file management unit 100 has the file access management unit 130 for managing the reading states of the respective optical disks, and at the start of file writing, an optical disk having the most unused data blocks is selected as an optical disk for file writing, from among optical disks from which no files are being read, whereby the previous reading process is not impeded. Therefore, when file reading and file writing coexist, an access speed for the reading can be kept constant without being disturbed by the writing.

Also in a case of a file extending over a plurality of optical disks, an access speed for reading can be kept constant.

Embodiment 9.

Figure 17:
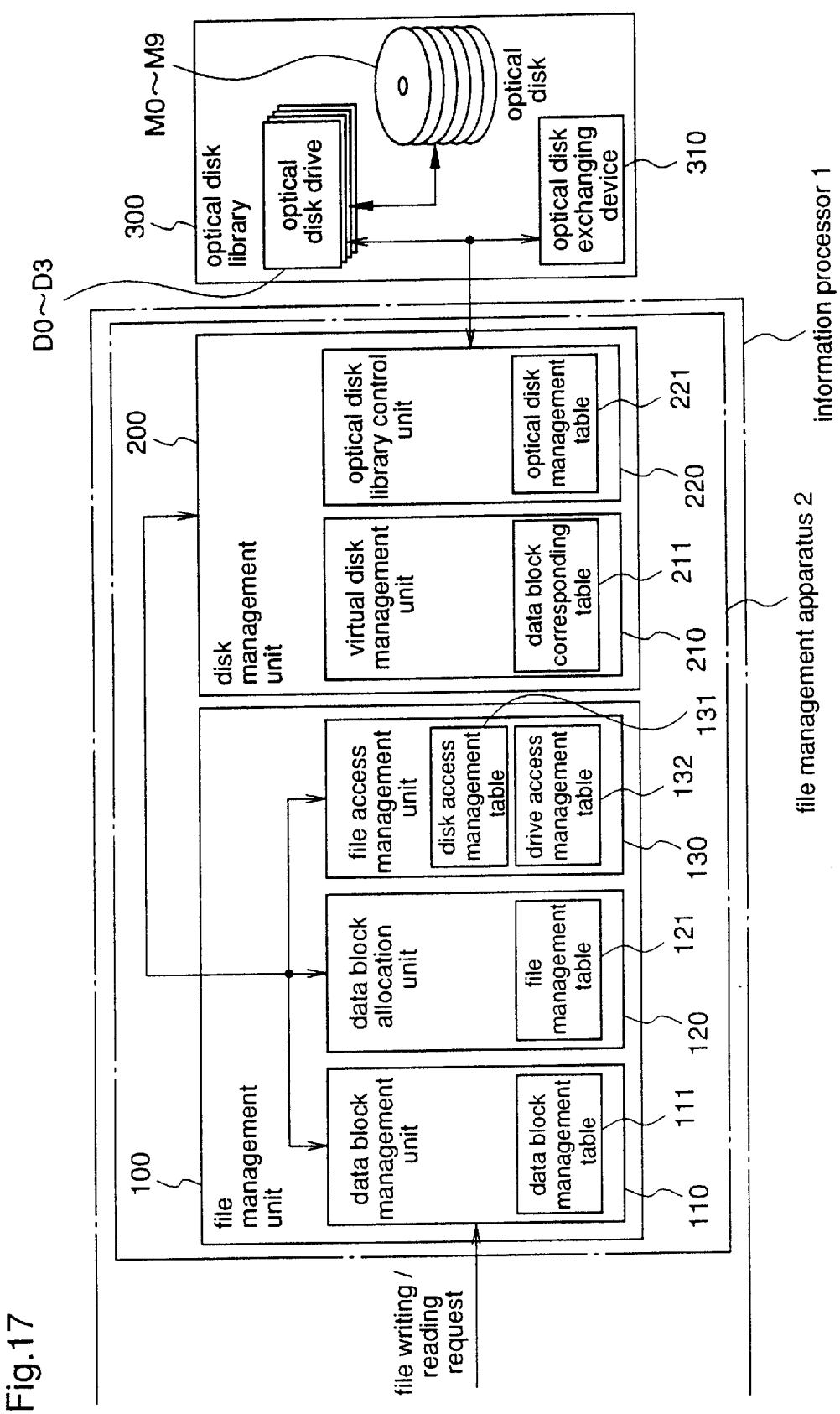
FIG. 17 is a block diagram illustrating a general construction of a file management apparatus in accordance with a ninth embodiment of the present invention.

FIG. 17 is a block diagram illustrating a general construction of a file management apparatus according to a ninth embodiment of the present invention. In FIG. 17, the same reference numerals as those in FIG. 12 designate the same or corresponding parts. The ninth embodiment of the present invention is different from the sixth embodiment in that a file writing request with a file size is received, the file access management unit 130 has a disk access management table 131 and a drive access management table 132, and the data block allocation unit 120 is constructed so that data blocks corresponding to the received file size are allocated to the requested file, before a data writing process.

FIG. 18 is a schematic diagram illustrating tho disk access management table 131 used in the file access management unit 130 according to the ninth embodiment of the invention. In the disk access management table 131 shown in FIG. 18, an optical disk number of each optical disk, the access state of the optical disk, and the data block allocation state of the optical disk correspond to one another.

Figure 19:
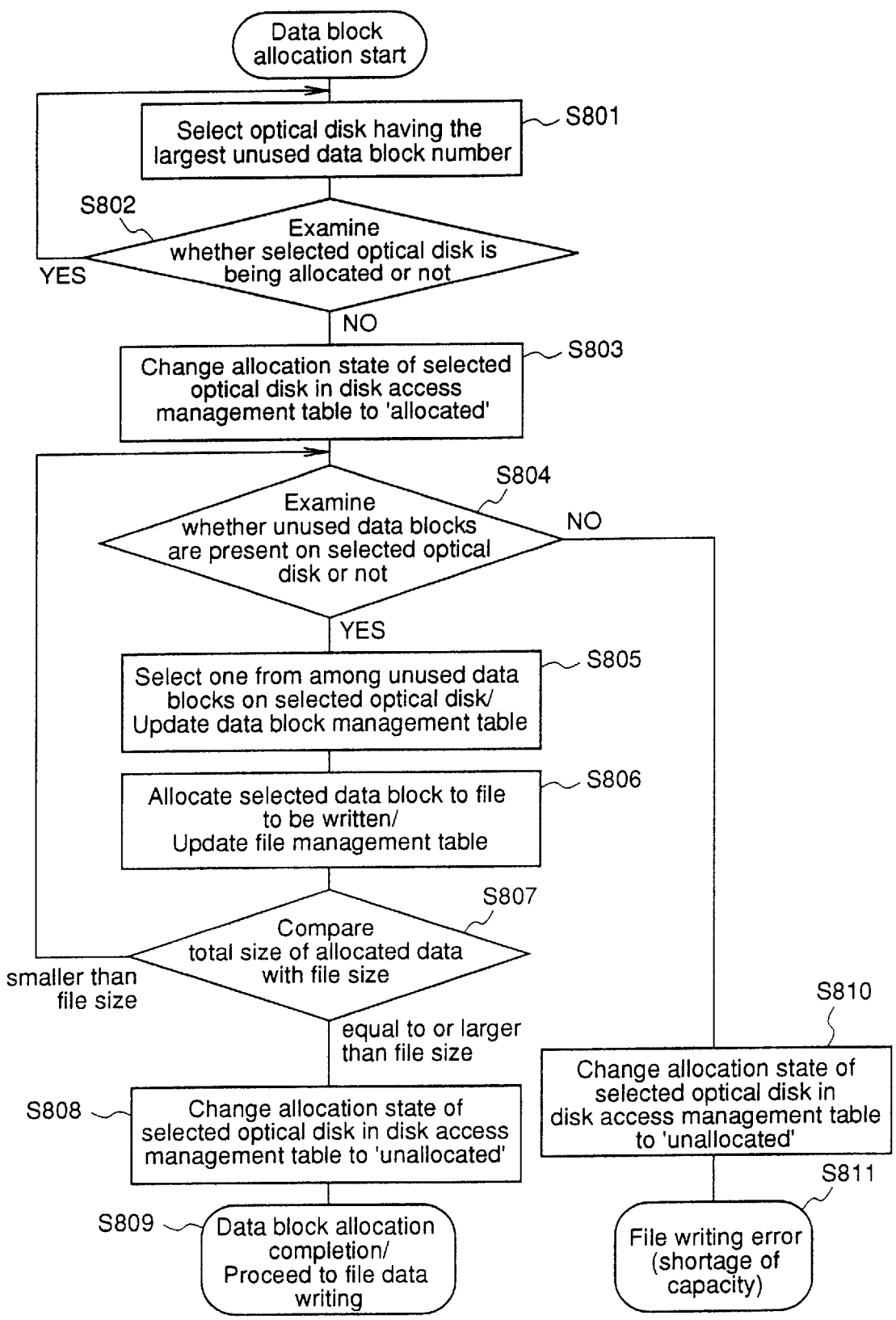
FIG. 19 is a flow chart showing the data block allocation operation of the file management apparatus according to the ninth embodiment of the invention.

FIG. 19 is a flow chart showing the data block allocation operation of the file management apparatus according to the ninth embodiment of the invention.

Figure 20:
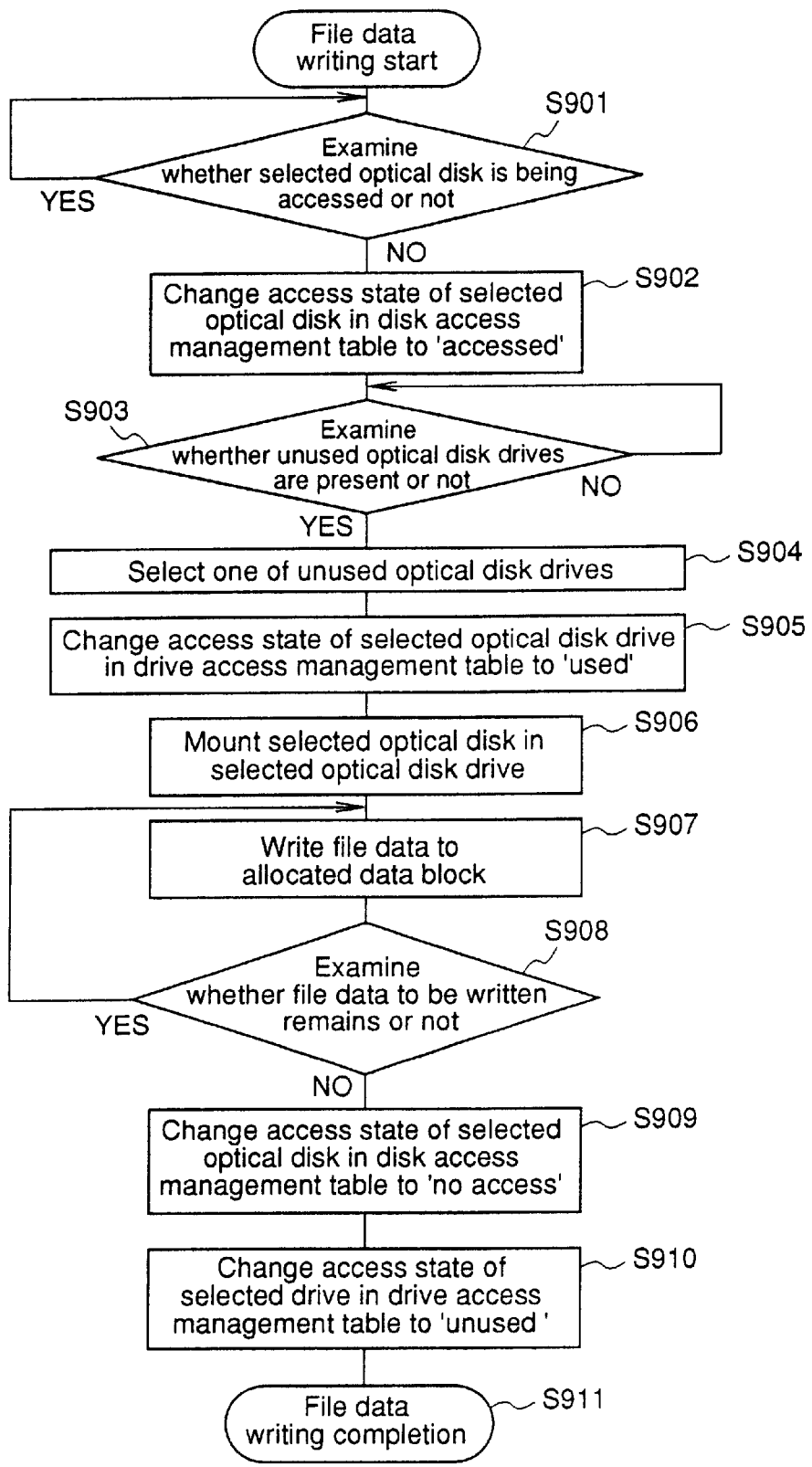
FIG. 20 is a flow chart showing the file data writing operation of the file management apparatus according to the ninth embodiment of the invention.

FIG. 20 is a flow chart showing the file data writing operation of the file management apparatus according to the ninth embodiment of the invention.

A description is given of the operation of the file management apparatus thus constructed, with reference to FIGS. 2 to 5(*a*) and 5(*b*), and 17 to 20.

In this case, the disk access management table 131 and the drive access management table 132 are currently in the states shown in FIGS. 18 and 13, respectively, and the other management tables in the file management apparatus are the same as in the first embodiment.

When a file writing request with a file size is made, the file management unit 100 receives the file writing request and the file size, and starts a data block allocation process shown in FIG. 19.

Initially, at step S801, as in the first embodiment, the data block management unit 110 selects the optical disk M0 having the most unused data blocks.

Next, at step S802, the file access management unit 130 examines the allocation state of file selected optical disk M0 using the disk access management table 131.

If the selected optical disk M0 is not being allocated, the allocation process proceeds to step S803.

In this case, since the selected optical disk M0 is being allocated, selection of another optical disk at step S801 and examination of the allocation state of the optical disk at step S802 are repeated until an optical disk which is not being allocated is found. Finally, the optical disk M3 is selected and it is found that the selected optical disk M3 is not being allocated. Thereafter, step S803 is executed.

At step S803, the file access management unit 130 changes the allocation slate of the selected optical disk M3 in the disk access management table 131 to "allocated".

Then, at step S804, the data block management unit 110 examines whether unused data blocks are present on the selected optical disk M3 or not, using the data block management table 111.

When no unused data blocks are present, step S810 is executed. The file access management unit 130 changes the allocation state of the optical disk M3 in the disk access management table 131 to "unallocated". Thereafter, the allocation process is completed as a file writing error due to shortage of the capacity (step S811).

In this case, it is supposed that the unused data blocks are present, and the allocation process proceeds to step S805.

At steps S805 and S806, similar to the processes at steps S103 and S104 described in the first embodiment, data block allocation is performed.

At step S807, the data block allocation unit 120 compares the file size which has been received with the file writing request with the total size of the data block allocated to the file.

When the total size of the data block is smaller than the file size, the allocations process returns to step S804 and steps S805 and S806 are performed again, thereby further allocating a data block.

When the total size of the data block is equal to or larger than the file size, step S808 is executed. The file access management unit 130 changes the allocation state of the optical disk M3 in the disk access management table 131 to "unallocated", thereby completing the data block allocation process (step S809).

When the data block allocation is completed, the file management unit 100 starts a file data writing process shown in FIG. 20.

Initially, at step S901, the file access management unit 130 examines the access state of the selected optical disk M3 using the disk access management table 131.

If the optical disk M3 is not being accessed, the writing process proceeds to step S902.

In this case, since the optical disk M3 is being accessed, the writing process is suspended and step S901 is repeated until the access is completed. Then, step S902 is executed.

At step S902, the file access management unit 130 changes the access state of the optical disk M3 in the disk access management table 131 to "accessed". In this case, since the access state of the optical disk M3 has been originally "accessed", it is not substantially changed.

Then, at step S903, the file access management unit 130 examines whether unused optical disk drives are present or not using the drive access management table 132.

If all the optical disk drives are used, the writing process is suspended and step S903 is repeated until one of the optical disk drives becomes unused.

In this case, since the unused optical disk drives D2 and D3 are present, the writing process proceeds to step S904.

At steps S904 to S906, similar to steps S503 to S505 described in the sixth embodiment, the optical disk M3 is mounted in the unused optical disk drive D2.

Then, at step S907, similar to step S105 described in the first embodiment, the file management unit 100 writes the file data to the data block which has allocated in the data block allocation process.

Then, at step S908, the file management unit 100 examines whether the file data to be further written remains or not. When the file data to be written remains, steps S907 and S908 are repeated and all the file data is written.

When it is found at step S908 that no file data to be written remains, at step S909, the file access management unit 130 changes the access state of the optical disk M3 in the disk access management table 131 to "no access".

At step S910, the file access management unit 130 changes the access state of the optical disk drive D2 in the drive access management table 132 to "unused", thereby completing the file data writing process (step S911).

In the above description, a file cannot extend over a plurality of optical disks. In FIG. 19, however, when the unused data blocks on the selected optical disk are used up at step S804, after the allocation state of the selected optical disk is changed to "unallocated" at step S810, another optical disk is selected again at step S801, thereby allocating data blocks on a plurality of optical disks to a file. Thereafter, the file is written to the allocated data blocks on the respective optical disks. In this way, a file extending over a plurality of optical disks can be created.

As described above, in the ninth embodiment of the invention, the data block allocation process is separated from the file data writing process, and the allocation of all the data blocks is performed before the file data writing. Therefore, even when access to an optical disk to which another file data is being written is not accepted, data block allocation to a file data is preformed in parallel with the previous writing process, and the data block allocation is already completed when the file data is written, whereby the total time required for the file writing can be shortened.

Embodiment 10.

A general construction of a file management apparatus according to a tenth embodiment of the present invention is shown in FIG. 17. The tenth embodiment of the present invention is different from the ninth embodiment in that the file access management unit 130 is constructed so that when a temporarily suspended writing process is resumed, among files to which data blocks are allocated by the data block allocation unit 120, a file that is to be written to an optical disk having the allocated data blocks, which optical disk has been already mounted in an optical disk drive, is given priority in writing.

Figure 21:
FIG. 21 is a schematic diagram illustrating a drive access management table in a file management apparatus in accordance with a tenth embodiment of the present invention.

FIG. 21 is a schematic diagram illustrating a drive access management table 132 used in the file access management until 130 according to the tenth embodiment of the invention. In the drive access management table 132 shown in FIG. 21, a drive number of each optical disk drive, the access state of the optical disk drive, and the reservation state of the optical disk drive correspond to one another.

Figure 22:
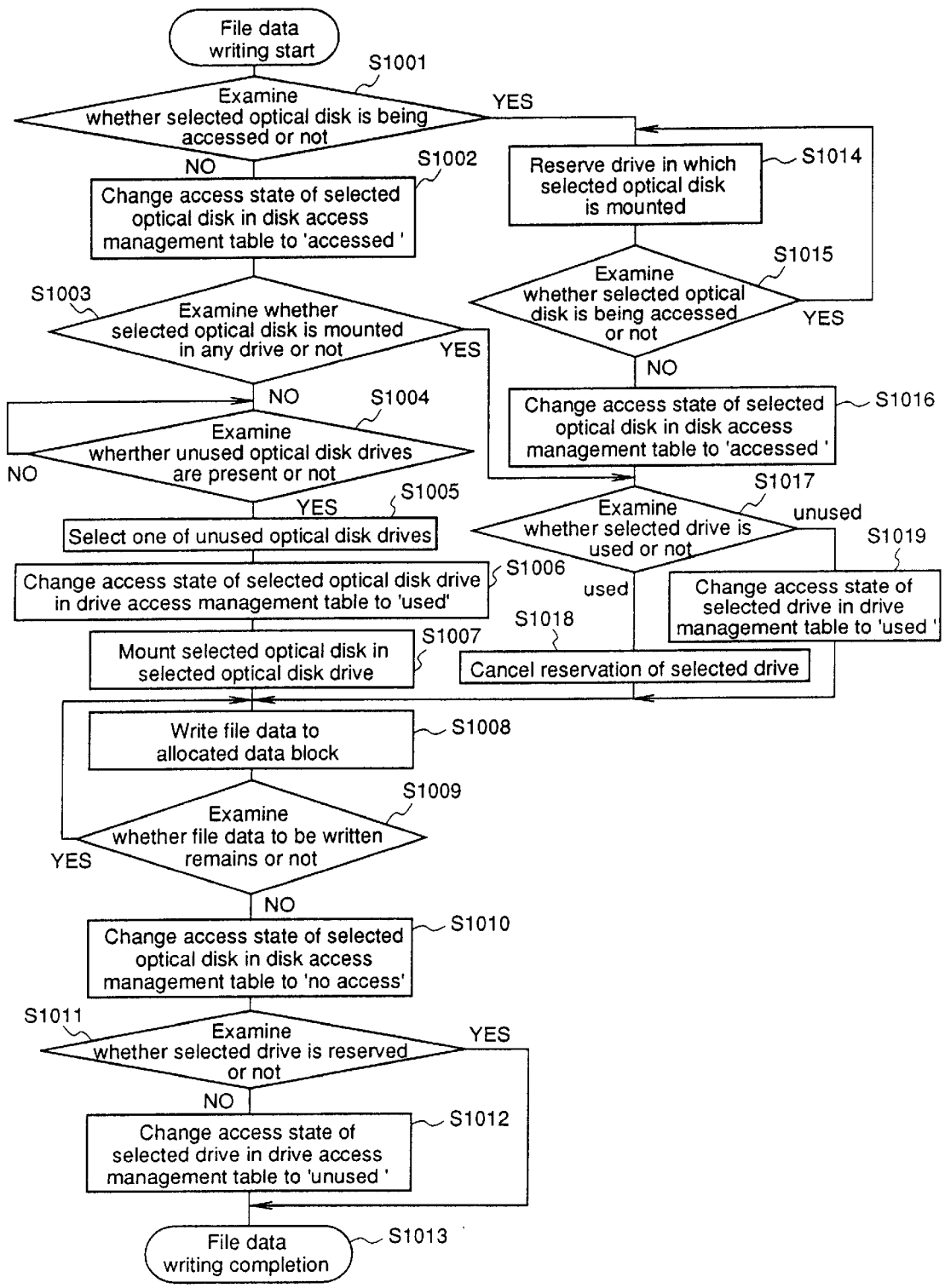
FIG. 22 is a flow chart showing the file data writing operation of the file management apparatus according to the tenth embodiment of the invention.

FIG. 22 is a flow chart showing the file data writing operation of the file management apparatus according to the tenth embodiment of the invention.

A description is given of the operation of the file management apparatus thus constructed, with reference to FIGS. 2 to 5(a) and 5(b), 18, 19, 21 and 22.

In this case, it is supposed that the optical disk M3 is mounted in the optical disk drive D0, the disk access management table 131 is currently in the state shown in FIG. 18, and the other management tables in the file management apparatus are the same as in the first embodiment.

A description will be given of two cases of the access state of the optical disk M3 in the disk access management table 131; the case where the optical disk M3 is in the state of "accessed" as shown in FIG. 18 and the case where the optical disk M3 is in the state of "no access".

The case where the optical disk M3 is currently in the state of "accessed" is described.

The data block allocation operation shown in FIG. 19 after the file management unit 100 receives a file writing request and a file size is identical that in the ninth embodiment, and no description is given thereof.

When the data block allocation is completed, the file management unit 100 starts the file data writing process shown in FIG. 22.

Initially, at step S1001, as in the ninth embodiment, the file access management unit 130 examines the access state of the selected optical disk M3 using the disk access management table 131.

In this case, since the optical disk M3 is being accessed, step S1014 is executed. The file access management unit 130 changes the reservation state of the optical disk drive D0 in which the optical disk M3 is mounted, in the drive access management table 132 to "reserved".

Thereafter, at step S1015, the file access management unit 130 examines the access state of the optical disk M3 again, and when the optical disk M3 is being accessed, the writing process is suspended and steps S1014 and S1015 are repeated until the access to the optical disk M3 is completed.

When the access to the optical disk M3 is completed at step S1015, step S1016 is executed. The file access management unit 130 changes the access state of the optical disk M3 in the disk access management table 131 to "accessed".

Then, at step S1017, the file access management unit 130 examines the access state of the optical disk drive D0 in which the optical disk M3 is mounted.

If the optical disk drive D0 is unused, step S1019 is executed. The file access management unit 130 changes the access state of the optical disk drive D0 in the drive access management table 132 to "used". Thereafter, the writing process proceeds to step S1008.

In this case, since the optical disk drive D0 is used, step S1018 is executed. The file access management unit 130 changes the reservation state of the optical disk drive D0 in the drive access management table 132 to "unreserved", and the writing process proceeds to step S1008.

At steps S1008 and S1009, similar to steps S907 and S908 described in the ninth embodiment, the file is written to the allocated data block. When the writing is completed, at step S1010, the file access management unit 130 changes the access state of the optical disk M3 in the disk access management table 131 to "no access".

Then, at step S1011, the file access management unit 130 examines whether the optical disk drive D0 used for the writing is reserved or not using the drive access management table 132.

If the optical disk drive D0 is reserved, the file data writing process is completed (step S1013).

In this case, since the optical disk drive D0 is not reserved, step S1012 is executed. The file access management unit 130 changes the access state of the optical disk drive D0 used for the writing in the drive access management table 132 to "unused", thereby completing the file data writing process (step S1013).

The case where the optical disk M3 is currently in the state of "no access" in the disk access management table 131 is described.

In this case, since the optical disk M3 is not being accessed, at step S1002, the file access management unit 130 changes the access state of the optical disk M3 in the disk access management table 131 to "accessed".

Then, at step S1003, it is examined whether the optical disk M3 is mounted in one of the optical disk drives or not.

When the optical disk M3 is mounted in one of the optical disk drives, the writing process proceeds to step S1017 and the following processes are as described above.

Meanwhile, when the optical disk M3 is mounted in none of the optical disk drives, step S1004 is executed. At steps S1004 to S1007, similar to steps S502 to S505 described in the sixth embodiment, the optical disk M3 is mounted to the selected optical disk drive.

Then, step S1008 is executed and the following processes are as described above, thereby completing the file data writing process.

In the above description, a file cannot extend over a plurality of optical disks. In FIG. 19, however, when the unused data blocks on the selected optical disk are used up at step S804, after the allocation state of the selected optical disk is changed to "unallocated" at step S810, another optical disk is selected again at step S801, thereby allocating data blocks on a plurality of optical disks to a file. Thereafter, the file is written to tho allocated data blocks on the respective optical disks. In this way, a file extending over a plurality of optical disks can be created.

As described above, in the tenth embodiment of the invention, the data block allocation process is separated from the file data writing process, and the allocation of all the data blocks is performed before the file data writing. Further, a file data that is to be written to an optical disk, which has been already mounted in an optical disk drive, is given priority in writing. Therefore, even when across to an optical disk to which another file data is being written is not accepted, if there is a request that is waiting for writing to an optical disk which has been already mounted in an optical disk drive, the writing request is first processed. Consequently, the exchange of optical disks is decreased, whereby time required for the writing can be shortened.
Embodiment 11.

A general construction of a file management apparatus according to an eleventh embodiment of the present invention is shown in FIG. 1. The eleventh embodiment of the present invention is different from the first embodiment in that the data block management unit 110 is constructed so that available capacities of the respective optical disks M0 to M9 are externally displayed based on the data block management table 111 and information form the virtual disk management unit 210.

A description is given of the operation of the file management apparatus thus constructed, with reference to FIGS. 1 to 5(a) and 5(b).

As described in the prior art and the first to ninth embodiments of the present invention, when a file data is written, a use flag of a data block to which the file data is written, in the data block management table 111 is changed from "unused" to "used".

When the use states of the data blocks at one point of time are obtained, the data block management unit 110 counts the unused data blocks or the used data blocks from the data block management table 111 to give the unused quantity or the used quantity to the user.

When the use states of the data blocks on cach optical disk at one point of time are obtained, the data block management unit 110 counts the unused data blocks or the used data blocks only on the optical disk the use state of which is to be obtained, from the data block management table 111 using information from the data block corresponding table 211 in the virtual disk management unit 210, to give the unused quantity or the used quantity to the user.

As described above, in the eleventh embodiment of the invention, when a plurality of optical disks are virtually treated as a single disk, the available capacities of the respective optical disks are externally displayed. Therefore, even in such a case, the unused quantity or the used quantity of the data blocks on each storage medium is known to the user. Consequently, when a file cannot extend over a plurality of optical disks, the user can further know the largest file size which can be written.
Embodiment 12.

Figure 26:
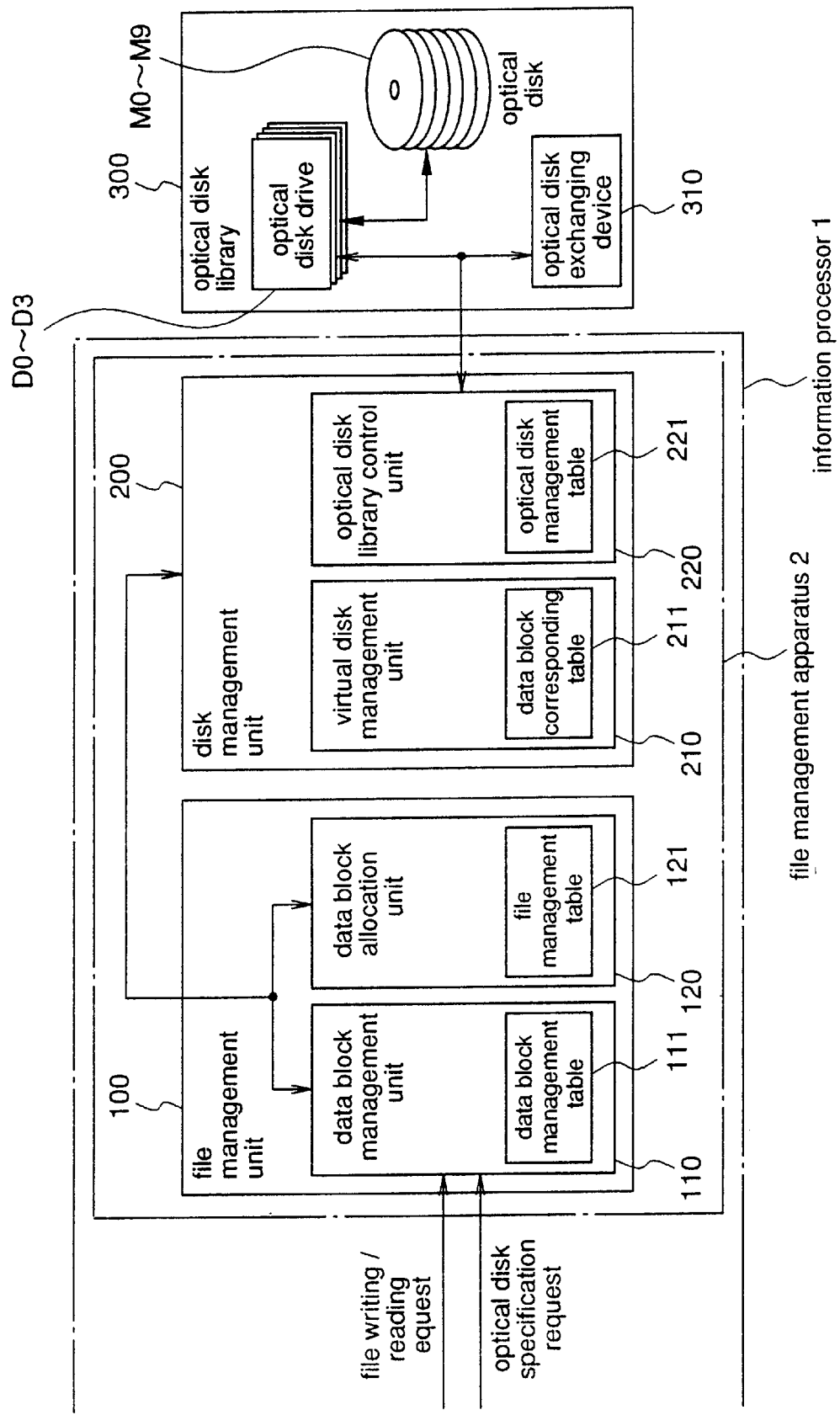
FIG. 26 is a block diagram illustrating a general construction of a file management apparatus according to the twelfth embodiment of the invention.

FIG. 26 is a block diagram illustrating a general construction of a file management apparatus according to a twelfth embodiment of the present invention. In FIG. 26, the same reference numerals as those in FIG. 1 designate the same or corresponding parts. The twelfth embodiment of the present invention is different from the first embodiment in that the file management apparatus is constructed so that an optical disk specification request including information for specifying an optical disk and a specified optical disk number is input from an input means (not shown) to the data block management unit 110, and the data block management unit 110 is constructed so that when a file is written, the specified optical disk or the optical disk having the most unused data blocks is selected as a disk for writing, according to the presence of the optical disk specification request.

Figure 23:
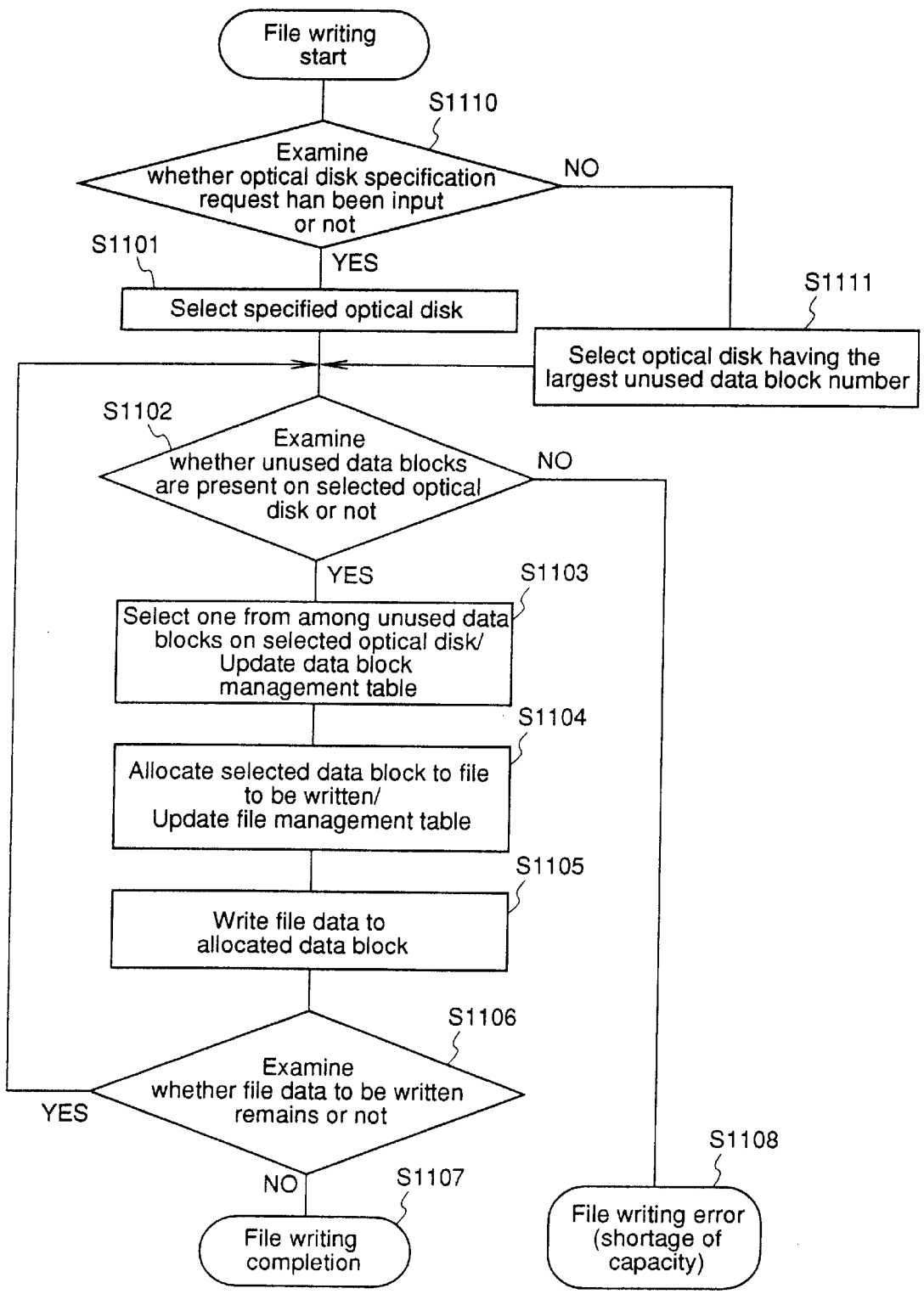
FIG. 23 is a flow chart showing the operation of a file management apparatus in accordance with a twelfth embodiment of the present invention.
Figure 24:
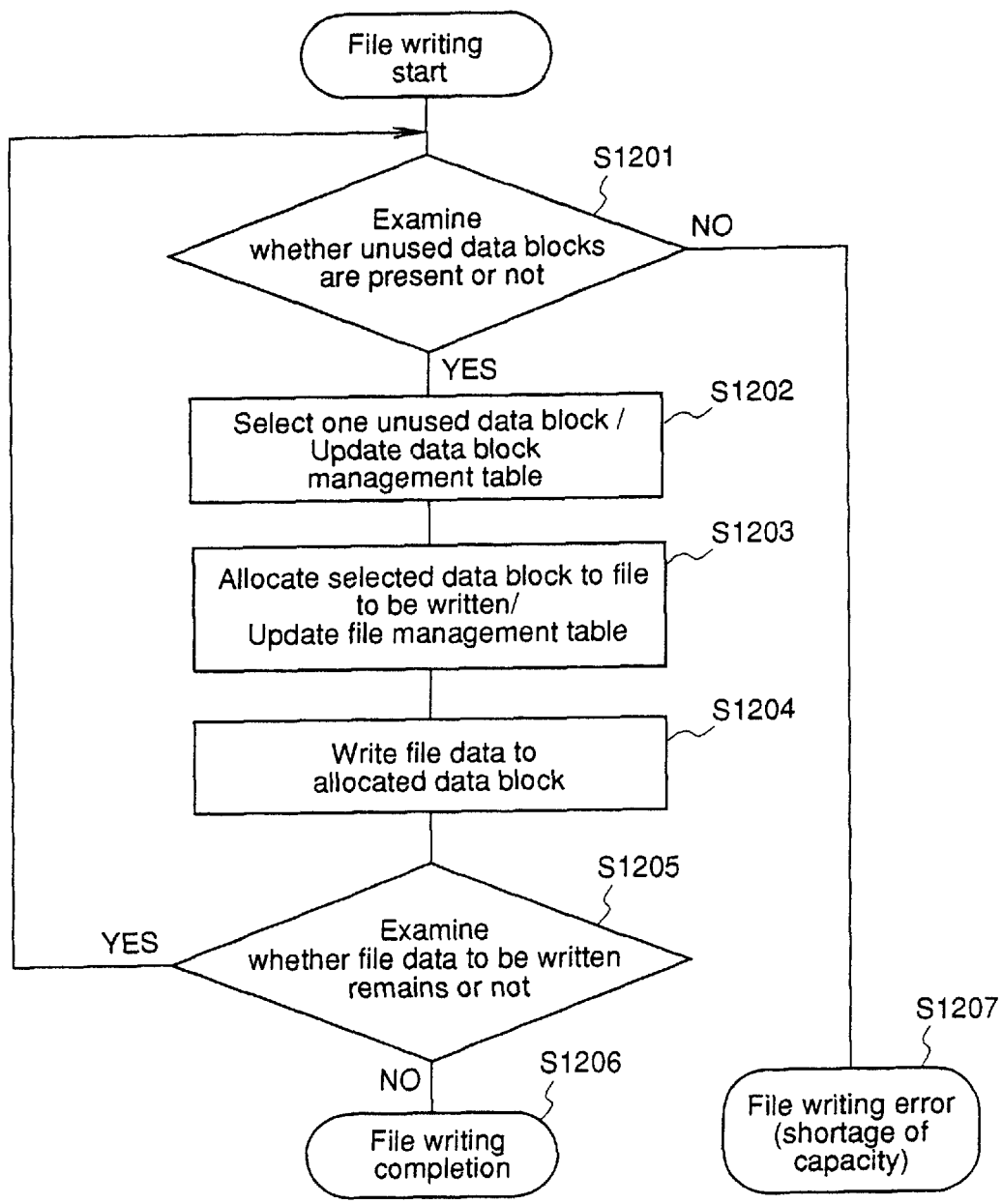
FIG. 24 is a flow chart showing the operation of a prior art information processor.

FIG. 23 is a flow chart showing the operation of the file management apparatus according to the twelfth embodiment of the invention, when the specified optical disk is selected as a disk for writing.

A description is given of the operation of the file management apparatus thus constructed, with reference to FIGS. 26 and 23.

Initially, using an input means (not shown), such as a keyboard, in the information processor 1, file user inputs information for specifying an optical disk and a specified optical disk number as an optical disk specification request. In this case, the optical disk number M0 is input. Then, the data block management unit 110 in the file management unit 100 receives and remains this optical disk specification request.

When a file writing request is made in this state, the file management unit 100 receives this file writing request and examines whether an optical disk specification request has been input or not at step S1110.

If no optical disk specification request has been input, step S1111 is executed. At step S1111, the data block management unit 110 selects a a optical disk having the most unused data blocks as a disk for writing. Thereafter, the writing process proceeds to step S1102 and the following operation is identical to that in the first embodiment.

In this case, since the optical disk specification request has been input, step S1101 is executed.

At step S1101, the data block management unit 110 selects the specified optical disk M0 as a disk for writing, and the writing process proceeds to step S1102.

Then, as in the first embodiment, the file is written to the specified optical disk M0.

In the above description, the file management apparatus is constructed so that a specified optical disk is selected as a disk for writing, according to an optical disk specification request which is input separately from a file writing request. However, receiving a specified optical disk number together with a file writing request, the data block management unit 110 may select an optical disk with the specified number, with the disk given priority, as a disk for writing.

As described above, in the twelfth embodiment of the invention, when a plurality of optical disks are virtually treated as a single disk, if an input for specifying a storage medium for writing is given from the outside at file writing, the specified storage medium is selected as a medium for writing, in place of the storage medium having the most unused data blocks. Therefore, in such a case, an optical disk for writing a file is specified by the user, whereby the user can select an optical disk for writing a file according to the frequency of access to the file and the storage capacity required for writing the file.

In addition, in the first to twelfth embodiments of the invention, although a plurality of optical disks are treated as a single storage device, the respective optical disks may be treated as storage devices. Also in such a case, the same effects as described above are obtained.

What is claimed is:

1. A file management apparatus used in an information processor using a media exchange type storage device comprising a plurality of storage media, at least one data access device for recording and reproducing data to/from the storage media, and a storage media exchanging means for mounting and dismounting the arbitrary storage medium in/from the arbitrary data access device, as an external storage device, the file management apparatus including:
   a data block management means for dividing storage regions of the respective storage media into data blocks of fixed capacity and managing the use states of the divided data blocks; and
   a data block allocation means for allocating unused data blocks shown by the data block management means to a file to which a writing request from the information processor has been given, wherein:
      data writing of the file to which the writing request has been given is performed to the data blocks allocated by the data block allocation means, using the storage media exchanging means and the data access device; and
      at the start of file writing, the storage medium having the most unused data blocks which are shown by the data block management means is selected as a medium for writing.

2. The file management apparatus of claim 1 wherein the data block allocation means limits the data blocks allocated to the file to which the writing request has been given to a range of the data blocks on the selected storage medium.

3. The file management apparatus of claim 1 including:
   a file writing detection means for detecting the start and completion of the file writing; and
   a media writing management means for managing the presence of writing to the respective storage media based on information from the file writing detection means and information from the data block management means, wherein;
   when the data blocks on the storage medium to which a file is being written, shown by the media writing management means, are allocated for writing a new file by the data block allocation means, the new file writing is temporarily suspended until the previous writing to the allocated storage medium is completed.

4. The file management apparatus of claim 2 including:
   a file writing detection means for detecting the start and completion of the file writing; and
   a media writing management means for managing the presence of writing to the respective storage media based on information from the file writing detection means and information from the data block management means, wherein;
   when the data blocks on the storage medium to which a file is being written, shown by the media writing management means, are allocated for writing a new file by the data block allocation means, the new file writing is temporarily suspended until the previous writing to the allocated storage medium is completed.

5. The file management apparatus of claim 1 including:
   a file writing detection means for detecting the start and completion of the file writing; and
   a media writing management means for managing the presence of writing to the respective storage media based on information from the file writing detection means and information from the data block management means, wherein;
   when the data blocks on the storage medium to which a file is being written, shown by the media writing management means, are allocated for writing a new file by the data block allocation means, the new file writing is aborted and the allocation of the data blocks is nullified.

6. The file management apparatus of claim 2 including:
   a file writing detection means for detecting the start and completion of the file writing; and
   a media writing management means for managing the presence of writing to the respective storage media based on information from the file writing detection means and information from the data block management means, wherein;
   when the data blocks on the storage medium to which a file is being written, shown by the media writing management means, are allocated for writing a new file by the data block allocation means, the new file writing is aborted and the allocation of the data blocks is nullified.

7. The file management apparatus of claim 1 wherein data reading of a file to which a reading request from the information processor has been given is performed from the data blocks on the storage medium to which the data have been written, using the storage media exchanging means and the data access device, the file management apparatus including:
   a file reading detection means for detecting the start and completion of the file reading; and
   a media reading management means for managing the presence of reading from the respective storage media based on information from the file reading detection means and information from the data block management means, wherein;
   when the data blocks on the storage medium from which a file is being read, shown by the media reading management means, are allocated for writing a new file by the data block allocation means, the new file writing is aborted or temporarily suspended until the reading from the allocated storage medium is completed.

8. The file management apparatus of claim 2 wherein data reading of a file to which a reading request from the information processor has been given is performed from the data blocks on the storage medium to which the data have been written, using the storage media exchanging means and the data access device, the file management apparatus including:
- a file reading detection means for detecting the start and completion of the file reading; and
- a media reading management means for managing the presence of reading from the respective storage media based on information from the file reading detection means and information from the data block management means, wherein;
- when the data blocks on the storage medium from which a file is being read, shown by the media reading management means, are allocated for writing a new file by the data block allocation means, the new file writing is aborted or temporarily suspended until the reading from the allocated storage medium is completed.

9. The file management apparatus of claim 1 wherein data reading of a file to which a reading request from the information processor has been given is performed from the data blocks on the storage medium to which the data have been written, using the storage media exchanging means and the data access device, the file management apparatus including:
- a file access detection means for detecting the start and completion of the file writing and reading; and
- a data access device management means for managing the use states of the respective data access devices based on information from the file access detection means, wherein;
- the data access device which is being used, shown by the data access device management means, is not used for writing a new file; and
- when the data access device management means shows that all the data access devices are being used, the new file writing is aborted or temporarily suspended until one of the data access devices becomes unused.

10. The file management apparatus of claim 2 wherein data reading of a file to which a reading request from the information processor has been given is performed from the data blocks on the storage medium to which the data have been written, using the storage media exchanging means and the data access device, the file management apparatus including:
- a file access detection means for detecting the start and completion of the file writing and reading; and
- a data access device management means for managing the use states of the respective data access devices based on information from the file access detection means, wherein;
- the data access device which is being used, shown by the data access device management means, is not used for writing a new file; and
- when the data access device management means shows that all the data access devices are being used, the new file writing is aborted or temporarily suspended until one of the data access devices becomes unused.

11. The file management apparatus of claim 1 including:
- a file writing detection means for detecting the start and completion of the file writing; and
- a media writing management means for managing the presence of writing to the respective storage media based on information from the file writing detection means and information from the data block management means, wherein;
- at the start of file writing, from among the storage media to which no files are being written, shown by the media writing management means, the storage medium having the most unused data blocks which are shown by the data block management means is selected as a medium for writing.

12. The file management apparatus of claim 2 including:
- a file writing detection means for detecting the start and completion of the file writing; and
- a media writing management means for managing the presence of writing to the respective storage media based on information from the file writing detection means and information from the data block management means, wherein;
- at the start of file writing, from among the storage media to which no files are being written, shown by the media writing management means, the storage medium having the most unused data blocks which are shown by the data block management means is selected as a medium for writing.

13. The file management apparatus or claim 1 wherein data reading of a file to which a reading request from the information processor has been given is performed from the data blocks on the storage medium to which the data have been written, using the storage media exchanging means and the data access device, the file management apparatus including:
- a file reading detection means for detecting the start and completion of the file reading; and
- a media reading management means for managing the presence of reading from the respective storage media based on information from the file reading detection means and information from the data block management means, wherein;
- at the start of file writing, from among the storage media from which no files are being read, shown by the media reading management means, the storage medium having the most unused data blocks which are shown by the data block management means is selected as a medium for writing.

14. The file management apparatus of claim 2 wherein data reading of a file to which a reading request from the information processor has been given is performed from the data blocks on the storage medium to which the data have been written, using the storage media exchanging means and the data access device, the file management apparatus including:
- a file reading detection means for detecting the start and completion of the file reading; and
- a media reading management means for managing the presence of reading from the respective storage media based on information from the file reading detection means and information from the data block management means, wherein;
- at the start of file writing, from among the storage media from which no files are being read, shown by the media reading management means, the storage medium having the most unused data blocks which are shown by the data block management means is selected as a medium for writing.

15. The file management apparatus of claim 3 wherein the data block allocation means receives a file size together with the file writing request from the information processor, and allocates data blocks corresponding to the received file size to the file, before the data writing.

16. The file management apparatus of claim 4 wherein the data block allocation means receives a file size together with the file writing request from the information processor, and allocates data blocks corresponding to the received file size to the file, before the data writing.

17. The file management apparatus of claim 7 wherein the data block allocation means receives a file size together with the file writing request from the information processor, and allocates data blocks corresponding to the received file size to the file, before the data writing.

18. The file management apparatus of claim 8 wherein the data block allocation means receives a file size together with the file writing request from the information processor, and allocates data blocks corresponding to the received file size to the file, before the data writing.

19. The file management apparatus of claim 9 wherein the data block allocation means receives a file size together with the file writing request from the information processor, and allocates data blocks corresponding to the received file size to the file, before the data writing.

20. The file management apparatus of claim 10 wherein the data block allocation means receives a file size together with the file writing request from the information processor, and allocates data blocks corresponding to the received file size to the file, before the data writing.

21. The file management apparatus of claim 15 wherein when the temporarily suspended writing is resumed, among the files to which the data blocks are allocated by the data block allocation means, the file that is to be written to the storage medium having the allocated data blocks which has been mounted in the data access device is given priority.

22. The file management apparatus of claim 16 wherein when the temporarily suspended writing is resumed, among the files to which the data blocks are allocated by the data block allocation means, the file that is to be written to the storage medium having the allocated data blocks which has been mounted in the data access device is given priority.

23. The file management apparatus of claim 17 wherein when the temporarily suspended writing is resumed, among the files to which the data blocks are allocated by the data block allocation means, the file that is to be written to the storage medium having the allocated data blocks which has been mounted in the data access device is given priority.

24. The file management apparatus of claim 18 wherein when the temporarily suspended writing is resumed, among the files to which the data blocks are allocated by the data block allocation means, the file that is to be written to the storage medium having the allocated data blocks which has been mounted in the data access device is given priority.

25. The file management apparatus of claim 19 wherein when the temporarily suspended writing is resumed, among the files to which the data blocks are allocated by the data block allocation means, the file that is to be written to the storage medium having the allocated data blocks which has been mounted in the data access device is given priority.

26. The file management apparatus of claim 20 wherein when the temporarily suspended writing is resumed, among the files to which the data blocks are allocated by the data block allocation means, the file that is to be written to the storage medium having the allocated data blocks which has been mounted in the data access device is given priority.

27. The file management apparatus of claim 2 including;
a virtual disk management means for managing sets of media numbers for identifying the storage media and data block numbers for identifying the data blocks on the respective storage media, and the corresponding virtual data block numbers for identifying the data blocks on all the storage media, converting, for a writing request to the data block specified by the virtual data block number, the virtual data block number of the requested data block into the corresponding media number and data block number, and performing writing to the data block with the obtained data block number on the storage medium with the obtained media number, using the storage media exchanging means and the data access device, wherein:
the data block is specified by the virtual data block number in the data block management means and the data block allocation means;
writing to the data block allocated by the data block allocation means is performed by the virtual disk management means; and
available capacities of the respective storage media are externally displayed based on information from the data block management means and the virtual disk management means.

28. A file management method used in an information processor using a media exchange type storage device comprising a plurality of storage media, at least once data access device for recording and reproducing data to/from the storage media, and a storage media exchanging means for mounting and dismounting the arbitrary storage medium in/from the arbitrary data access device, as an external storage device, the file management method including:
a data block management process for dividing storage regions of the respective storage media into data blocks of fixed capacity and managing the use states of the divided data blocks; and
a data block allocation process for allocating unused data blocks shown by the data block management process to a file to which a writing request from the information processor has been given, wherein:
data writing of the file to which the writing request has been given is performed to the data blocks allocated by the data block allocation process, using the storage media exchanging means and the data access device; and
at the start of file writing, the storage medium having the most unused data blocks which are shown by the data block management process is selected as a disk to be written.

29. The file management method of claim 28 wherein the data block allocation process limits the data blocks allocated to the file to which the writing request has been given to a range of the data blocks on the selected storage medium.

30. A recording medium containing a program for performing file management by a computer, which medium is readable by the computer, in an information processor using a media exchange type storage device comprising a plurality of storage media, at least one data access device for recording and reproducing data to/from the storage media, and a storage media exchanging means for mounting and dismounting the arbitrary storage medium in/from the arbitrary data access device, as an external storage device, the recording medium wherein:
file management processes in the program include a data block management process for dividing storage regions of the respective storage media into data blocks of fixed capacity and managing the use states of the divided data blocks, and a data block allocation process for allocating unused data blocks shown by the data block management process to a file to which a writing request from the information processor has been given;

data writing of the file to which the writing request has been given is performed to the data blocks allocated by the data block allocation process, using the storage media exchanging means and the data access device; and at the start of file writing, the storage medium having the most unused data blocks which are shown by tho data block management process is selected as a disk to be written.

31. The recording medium of claim 30 containing the program including the file management processes, wherein the data block allocation process limits the data blocks allocated to the file to which the writing request has been given to a range of the data blocks on the selected storage medium.

32. A file management apparatus used in an information processor using a media exchange type storage device comprising a plurality of storage media, at least one of a data access device for recording and reproducing data to/from the storage media, and a storage media exchanging means for mounting and dismounting the arbitrary storage medium in/from the arbitrary data access device, as an external storage device, the file management apparatus including:

a data block management means for dividing storage regions of the respective storage media into data blocks of fixed capacity and managing the use states of the divided data blocks;

a data block allocation means for allocating unused data blocks shown by the data block management means to a file to which a writing request from the information processor has been given, said data blocks being limited to a range of data blocks on the selected storage medium; and a virtual disk management means for managing sets of media numbers for identifying the storage media and data block numbers for identifying the data blocks on the respective storage media, and the corresponding virtual data block numbers for identifying the data blocks on all the storage media, converting, for a writing request to the data block specified by the virtual data block number, the virtual data block number of the requested data block into the corresponding media number and data block number, and performing writing to the data block with the obtained data block number on the storage medium with the obtained media number, using the storage media exchanging means and the data access device, wherein:

(1) data writing of the file to which the writing request has been given is performed on the data blocks allocated by the data block allocation means, using the storage media exchanging means and the data access device;

(2) at the start of file writing, the storage medium having the most unused data blocks that are shown by the data block management means is selected as a medium for writing;

(3) the data block is specified by the virtual data block number in the data block management means and the data block allocation means;

(4) writing to the data block allocated by the data block allocation means is performed by the virtual disk management means; and (5) when an input specifying the storage medium for writing is given from the outside at the file writing, the specified storage medium is selected as a medium for writing, in place of the storage medium having the most unused data blocks.

* * * * *